United States Patent [19]

Sato

[11] Patent Number: 5,705,873
[45] Date of Patent: Jan. 6, 1998

[54] LIGHT-QUANTITY CONTROL DEVICE

[75] Inventor: Osamu Sato, Saitama-ken, Japan

[73] Assignee: Canon Denshi Kabushiki Kaisha, Tokyo, Japan

[21] Appl. No.: 356,705

[22] Filed: Dec. 15, 1994

[30] Foreign Application Priority Data

| Dec. 22, 1993 | [JP] | Japan | 5-325407 |
| Dec. 22, 1993 | [JP] | Japan | 5-325408 |
| Dec. 22, 1993 | [JP] | Japan | 5-325409 |
| Dec. 22, 1993 | [JP] | Japan | 5-325410 |
| May 30, 1994 | [JP] | Japan | 6-117031 |
| May 30, 1994 | [JP] | Japan | 6-117032 |

[51] Int. Cl.$^6$ .............. H02K 1/00; H02K 1/12; G03B 9/08; G03B 9/02
[52] U.S. Cl. .............. 310/193; 310/254; 354/234.1; 354/271.1
[58] Field of Search .............. 354/234.1, 271.1, 354/435, 439, 451; 310/49 R, 187, 162, 254; 361/772, 773

[56] References Cited

U.S. PATENT DOCUMENTS

| 3,935,524 | 1/1976 | Cap et al. | 318/640 |
| 4,319,822 | 3/1982 | Tezuka et al. | 354/234 |
| 4,467,233 | 8/1984 | Moren et al. | 310/162 |
| 4,575,652 | 3/1986 | Gogue | 310/49 R |
| 4,672,253 | 6/1987 | Tajima et al. | 310/269 |
| 4,691,132 | 9/1987 | Bertram et al. | 310/156 |
| 4,700,098 | 10/1987 | Kawashima | 310/186 |
| 4,725,752 | 2/1988 | Shirani et al. | 310/268 |
| 4,739,125 | 4/1988 | Watanabe et al. | 174/52 FP |
| 4,874,975 | 10/1989 | Hertich | 310/186 |

(List continued on next page.)

FOREIGN PATENT DOCUMENTS

| 3231722 | 10/1991 | Japan | 354/271.1 |
| 4344157 | 11/1992 | Japan | 354/234.1 |
| 4344158 | 11/1992 | Japan | 354/234.1 |
| 6258683 | 9/1994 | Japan | 354/271.1 |
| 6273821 | 9/1994 | Japan | 354/271.1 |
| 6273822 | 9/1994 | Japan | 354/271.1 |

Primary Examiner—Steven L. Stephan
Assistant Examiner—Michael J. Wallace, Jr.
Attorney, Agent, or Firm—Robin, Blecker, Daley and Driscoll

[57] ABSTRACT

An optical apparatus having a light-quantity control device includes:

a) a rotating member having a plurality of magnetic poles;

b) a stator having a plurality of magnetic pole sections opposed to the rotating member;

c) a coil for exciting the stator;

d) an input device for inputting driving speed information as the driving speed of the rotating member;

e) an output device for outputting to the coil a driving signal for rotatably driving the rotating member less than one full rotation thereof on the basis of the driving speed information;

f) a detecting device for directly detecting a movement state of the rotating member and outputting a detection signal which varies approximately linearly with the position of the rotating member representing movement state information;

g) a forming device for forming rotating speed information of the rotating member from the detection signal;

h) a correcting device for correcting the driving speed information by the use of the rotating speed information, the correcting device providing a corrected driving speed information; and i) a light-quantity adjusting member adapted to be displaced by the rotation of the rotating member.

33 Claims, 24 Drawing Sheets

U.S. PATENT DOCUMENTS

| | | | |
|---|---|---|---|
| 4,884,091 | 11/1989 | Nawagomi | 354/271.1 |
| 4,897,681 | 1/1990 | Yamamoto et al. | 354/271.1 |
| 4,952,830 | 8/1990 | Shirakawa | 310/68 B |
| 5,000,534 | 3/1991 | Watanabe | 350/96.2 |
| 5,015,893 | 5/1991 | Shiozawa | 310/67 R |
| 5,072,162 | 12/1991 | Sato et al. | 318/268 |
| 5,111,098 | 5/1992 | Pecu et al. | 310/268 |
| 5,196,940 | 3/1993 | Sato | 358/228 |
| 5,264,896 | 11/1993 | Lee et al. | 354/435 |
| 5,361,110 | 11/1994 | Haraguchi | 354/234.1 |
| 5,371,633 | 12/1994 | Kawamura et al. | 359/739 |
| 5,418,588 | 5/1995 | Chigira | 354/234.1 |
| 5,430,519 | 7/1995 | Shimada et al. | 354/271.1 |
| 5,489,959 | 2/1996 | Akada | 354/234.1 |

FIG.3(a)
FIG.3(b)
FIG.3(c)
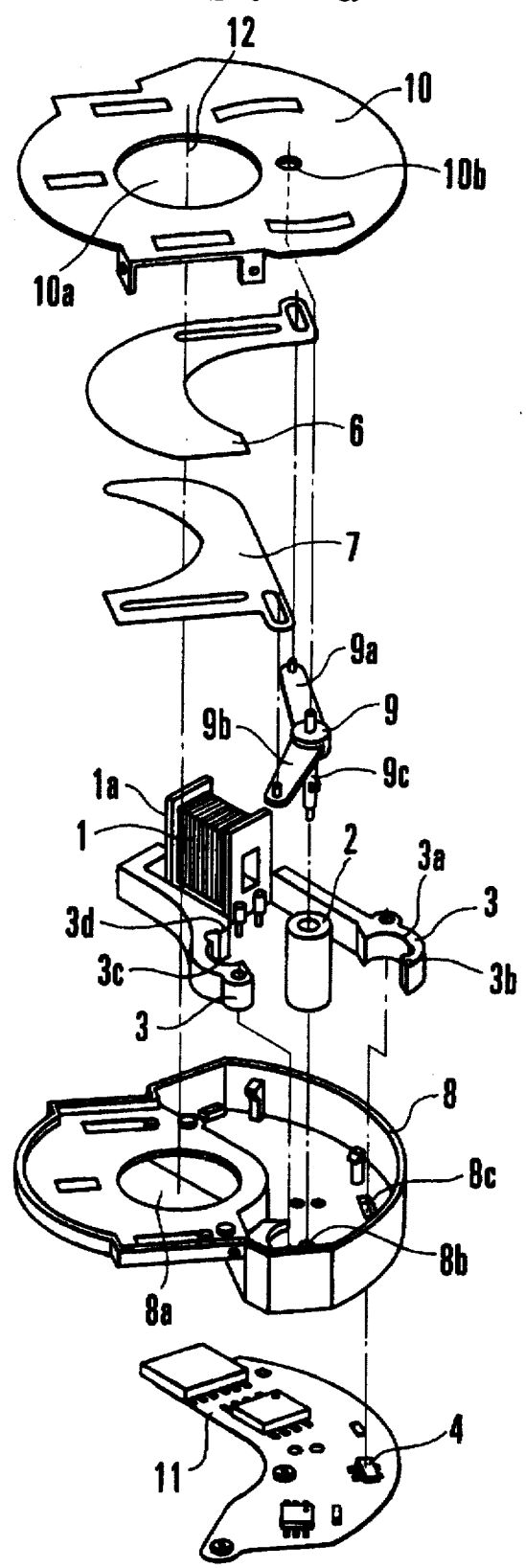
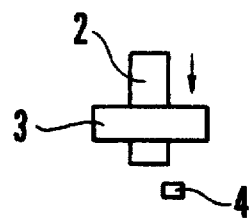
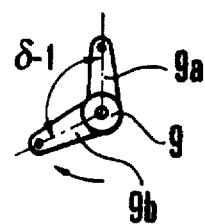

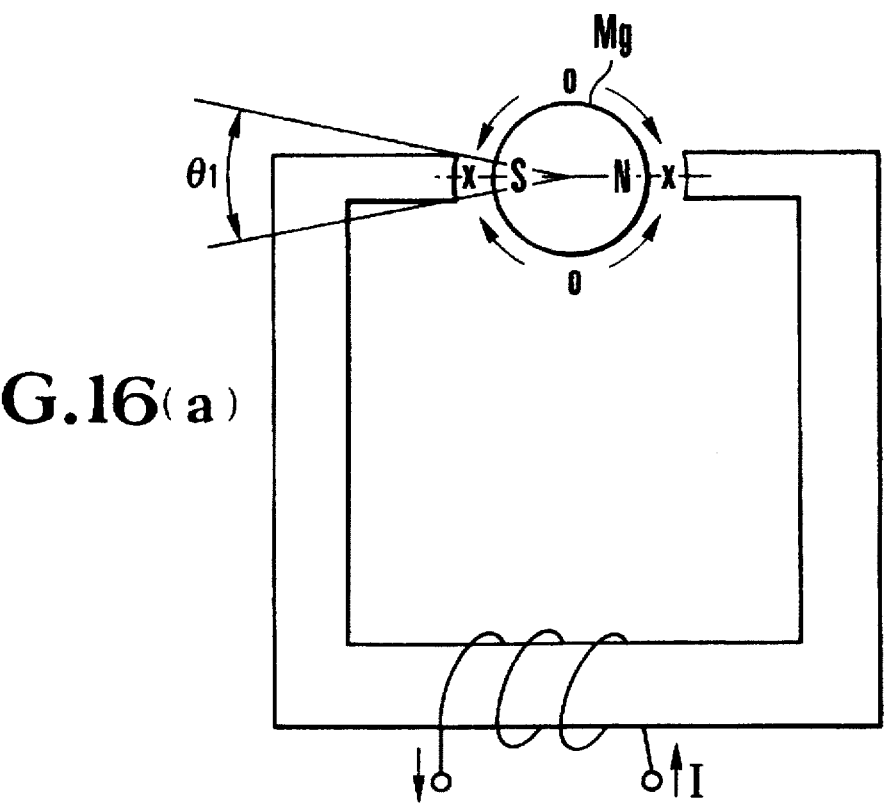
F I G. 16(a)
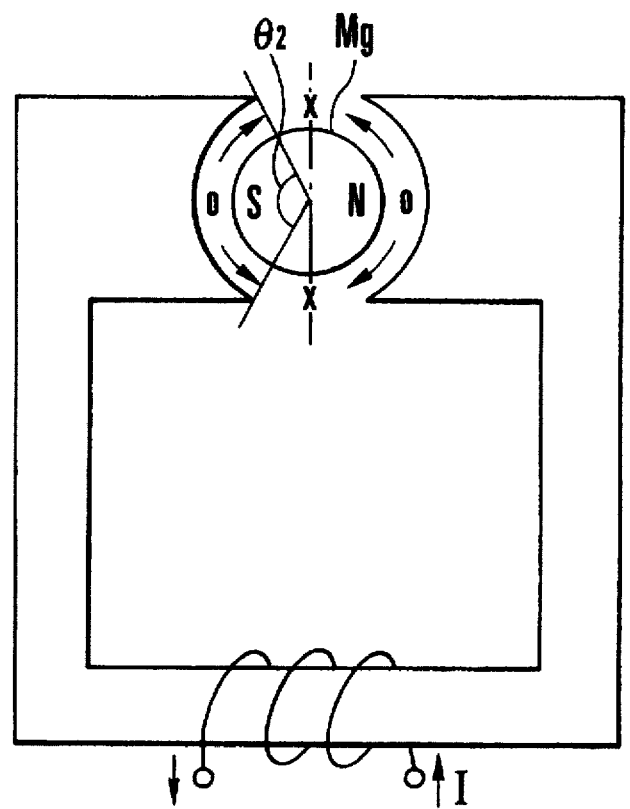
F I G. 16(b)

LIGHT-QUANTITY CONTROL DEVICE

BACKGROUND OF THE INVENTION

1. Field of the Invention

This invention relates to a light-quantity control device for use in a video camera or the like.

2. Description of the Related Art

In a light-quantity control device mounted in a photographic apparatus, such as a video camera, light-quantity control members 486 formed of a light-shielding material are driven by a motor consisting of an internal excitation type drive source 489, in which are provided, as shown, for example, in FIG. 25(a), a 2-pole-magnetized rotor magnet 482 and a yoke 483 arranged in the outer periphery of the rotor magnet 482 and forming a magnetic circuit together with the 2-pole-magnetized rotor magnet 482. Arranged in a gap between the rotor magnet 482 and the yoke 483 are a driving coil 481 and a damping coil 485 for detecting the rotating speed of the rotor magnet 482. Numeral 484 indicates a Hall element for detecting the rotational position of the rotor magnet 482 from the magnetic flux of the rotor magnet 482, and numeral 487 indicates a return spring for urging the light-quantity control members 486 in the closing direction.

FIGS. 25(b) and 25(c) show the conventional light-quantity control device as incorporated in a camera. Symbol L indicates an optical space; symbol D indicates a lens barrel space; numeral h1 indicates the width of the camera deck; numeral V1 indicates the height of the camera deck plus the lens barrel space; symbol h2 indicates the camera width enlarged as a result of the provision of guide bars 423 and 424 for the purpose of movably supporting the lens outside the lens barrel space D due to the rotation of the conventional light-quantity control members 486 by the drive source 489; and numeral V2 indicates the camera height enlarged as a result of the use of a cylindrical internal excitation type motor.

FIG. 25(d) shows the Hall element 484 as mounted on a printed circuit board 490 for Hall elements. A printed circuit board 488 for conduction between the printed circuit board 490 and the camera body is connected through lead wires or the like (not shown).

FIG. 26 is a block diagram of a light-quantity control device using this internal excitation type motor as the drive source. Symbol A indicates a lens section of a video camera; and symbol B indicates a camera control circuit section. The lens section A comprises: a zoom motor 500; a damping coil 501 that is integral with a drive source 502 of the light-quantity control device; a detecting device 503a (hall element 484) of a position detecting means 503; an automatic focusing motor 504; and a light-quantity control device 505 for detecting the light quantity of an object transmitted through the photographic optical system. The camera control circuit section B comprises: a video signal processing circuit 506 for processing a signal from the light-quantity detecting device 505 to output it as a video signal; a control circuit 507 for driving the automatic focusing motor 504 to effect focusing on the basis of the signal from the light-quantity control device 505; a drive amount setting means 508 for setting a drive amount in the opening and closing of an iris; an amplifier 510 for amplifying speed information from the damping coil 501; and a comparison means 511 for controlling the energization of the driving coil of the motor for driving the light-quantity control members 486 on the basis of a comparison of the speed information from the amplifier 510 with information from the drive amount setting means 508. The camera control circuit section B further comprises an amplifier 503b for amplifying positional information detected by the detecting device 503a (Hall element 434) of the detection means 503. The positional information from the amplifier 503b is input to the drive amount setting means 508.

To open and close the light-quantity control members 486 gently and smoothly, the conventional light-quantity control device, constructed as described above, performs speed control until a position providing an optimum light quantity is attained. In the closing direction, the light-quantity control members 486 are driven by the resilient force of the return spring 487.

The mechanical driving mechanism and the electrical control circuit, forming the light-quantity control device, are spaced apart from each other, the control circuit and the driving mechanism being respectively provided in the camera control circuit section B and the lens section A. The two sections are connected to each other through the printed circuit board 488 serving as an interface, on which the Hall element 484, a connector, etc. are mounted, a flexible printed circuit board (not shown) for connecting the printed circuit board 488 to the camera control circuit section B, etc.

SUMMARY OF THE INVENTION

In one aspect of the invention, it is possible to set the magnetic force value acting on the rotor as desired, by making different the surface area of one and another magnetic sections of a plurality of magnetic sections of a stator, opposing to the rotor. That is, when the rotor is driven by passing the current through the coil, the magnetic force acting on the rotor causes the drive resistance, so that a light-quantity control device can displace the light-quantity adjusting member with a small drive force by setting the magnetic force acting on the rotor as desired.

In another aspect of the invention, an output signal of a magnetic induction element capable of linearly detecting a rotation signal of a rotating member is used for speed control of the rotating member, whereby an optical apparatus having a high-precision light-quantity control device can be provided.

BRIEF DESCRIPTION OF THE DRAWINGS

FIGS. 3(a), 3(b) and 3(c) are exploded perspective views of a light-quantity control device according to the first embodiment of the present invention;

FIGS. 16(a) and 16(b) are diagrams showing the principle on which the detent torque is generated;

FIGS. 20(a) and 20(b) show modifications of the detent torque balancing/adjusting means shown in FIG. 19(b), of which FIG. 20(a) is a plan view and FIG. 20(b) is a sectional view taken along the line f-f of FIG. 20(a);

FIG. 23(c) shows the relationship between rotation angle and detent torque in a condition in which FIGS. 23(a) and 23(b) are combined;

DETAILED DESCRIPTION OF THE PREFERRED EMBODIMENTS

Figure 1:
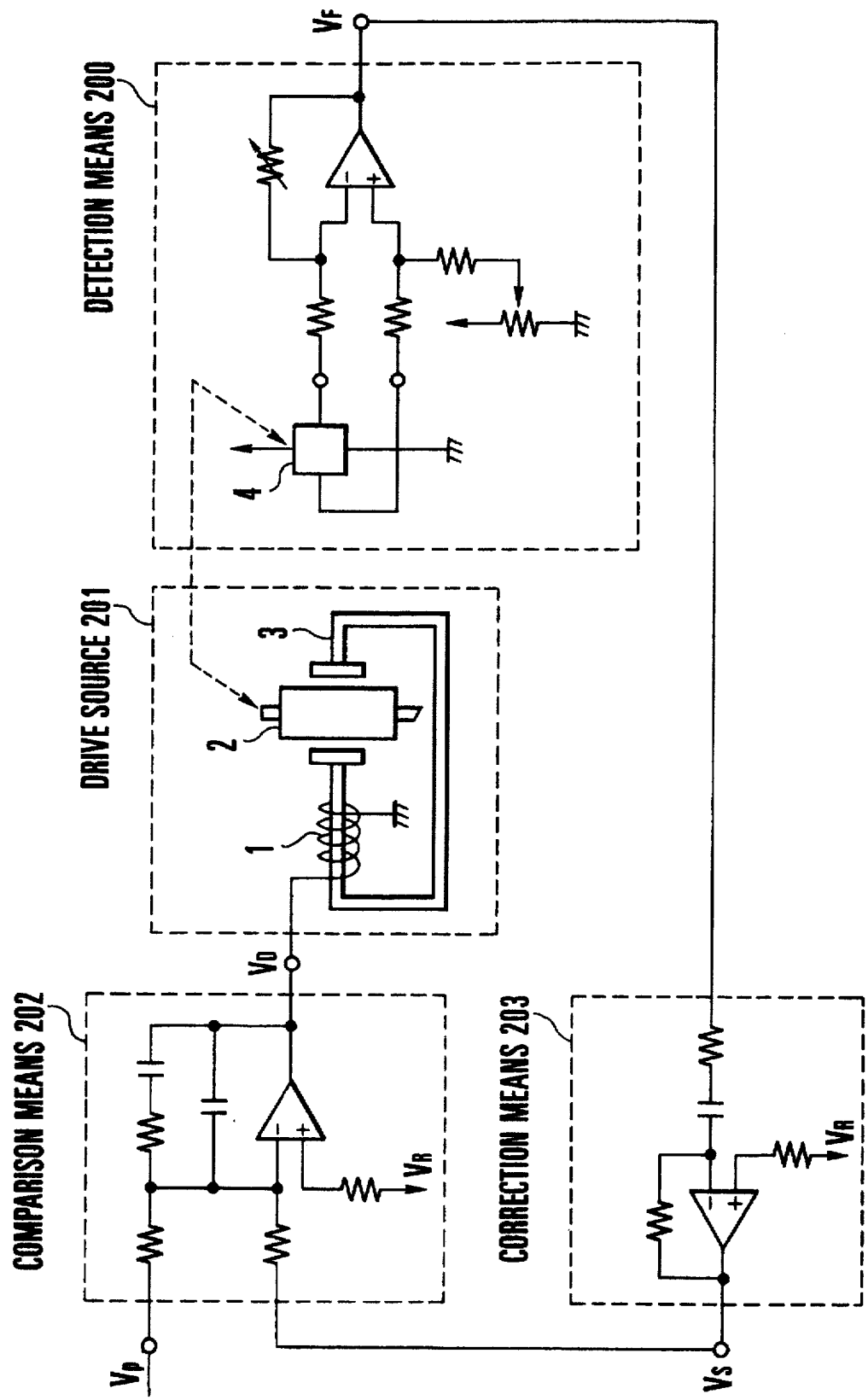
FIG. 1 is a circuit diagram showing the drive circuit of a light-quantity control device according to a first embodiment of the present invention.
Figure 2:
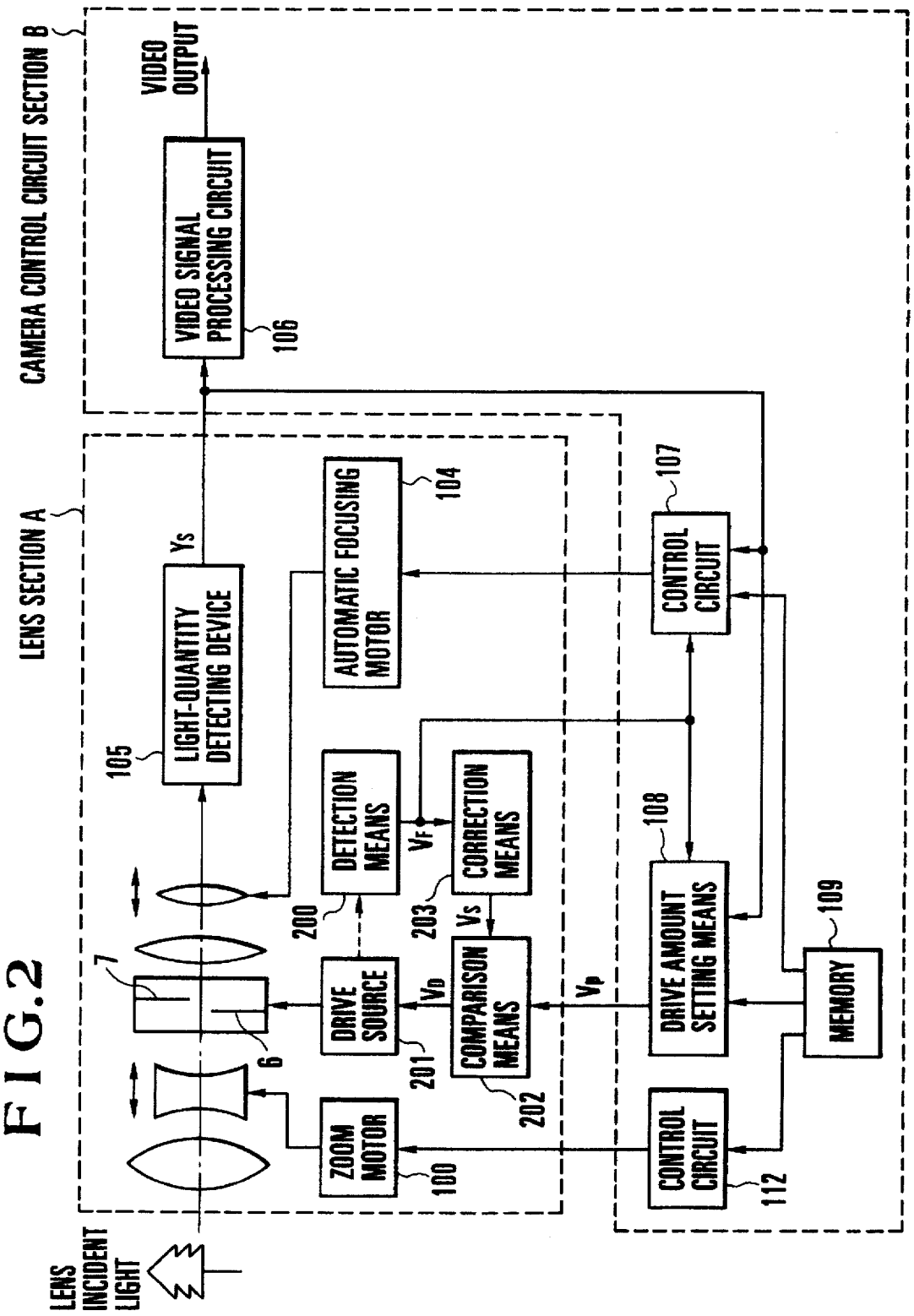
FIG. 2 is a block diagram showing a video camera in which the drive circuit of FIG. 1 is mounted.

FIGS. 1, 2 and 3(a) through 3(c) show the first embodiment of the present invention. FIG. 1 is a block diagram showing the drive circuit of a light-quantity control device; FIG. 2 is a block diagram showing a video camera using the drive circuit of FIG. 1; and FIGS. 3(a) through 3(c) are exploded perspective views of the light-quantity control device of FIG. 1.

The light-quantity control device shown in FIG. 3(a) is a light-quantity control device using a so-called external excitation type motor, in which the stator yoke is excited, as the drive source. Numeral 3 indicates a stator yoke composed of two yoke members which are circumferentially arranged with respect to an optical axis 12. A coil bobbin 1a around which a coil 1 is wound is attached to one of the yoke members. Numeral 2 indicates a radially 2-pole-magnetized rotor magnet which is arranged in a circumferential section formed in the forward end portion of the stator yoke in such a way as to leave a gap therebetween. Formed in the circumferential section of the stator yoke 3 are a pair of main poles 3a and 3c opposed to each other and having a large open angle (the geometrical angle made by the center of rotation of the rotor magnet 2 and both ends of the magnetic poles) and a pair of interpoles 3b and 3d opposed to each other and having a small open angle. In this embodiment, a detent torque in one direction is generated relative to the rotor magnet 2 by the difference between the open angle of the main poles and that of the interpoles. In this embodiment, the rotor magnet 2 is urged by this detent torque in such a way that light-quantity control members 6 and 7 are closed. Therefore, there is no need to use a return spring as in the prior art.

Numeral 9 indicates a transmission member consisting of a pair of arm sections 9a and 9b and an axle 9c that are formed as an integral unit. The axle 9c is secured to the axial hole of the rotor magnet 2, and operating pins formed respectively at the forward ends of the pair of arm sections 9a and 9b respectively engage with engagement holes formed in the light-quantity control members 6 and 7. By the rotation of the rotor magnet 2, the light-quantity control members 6 and 7 are moved in such a way that they face each other to diminish the aperture diameter, or moved away from each other to enlarge the aperture diameter. Due to this arrangement, the quantity of light impinging upon the lens can be adjusted.

Numeral 8 indicates a base plate, on which are formed an opening 8a, an engagement claw for retaining the stator yoke 3 through engagement therewith, a bearing 8b for rotatably supporting one axial end of the axle 9c fixed to the rotor magnet 2, a Hall-element opening 8c facing a Hall element 4, a guide pin adapted to be engaged with elongated holes for supporting and guiding formed in the light-quantity control members 6 and 7, etc. The motor section is fitted into an arcuate section on one side of the base plate 8. The light-quantity control members 6 and 7 are also attached from the same direction as the motor section. The front side opening of the base plate 8 is covered with a case 10, which includes an opening 10a, a bearing 10b for rotatably supporting the other axial end of the axle 9c, etc. and which holds the light-quantity control members 6 and 7 and prevents intrusion of dust or the like from the outside.

On the rear side of the base plate 8, a printed circuit board, for example, a flexible printed circuit board 11, is attached to the arcuate section of the base plate 8. Mounted on this flexible printed circuit board 11 is a motor driving circuit as shown in FIG. 1 including a Hall element 4 to effect signal exchange with the control circuit section of the camera. The magnetism of the rotor magnet 2 is detected from the thrusting direction by the Hall element 4 through the Hall-element opening 8c.

As shown in FIG. 3(b), the central position of the rotor magnet 2 is axially off with respect to the stator yoke 3, whereby a magnetically unbalanced state is generated in the rotor magnet 2, thereby generating an urging force directed axially downwards. Due to this arrangement, the generation of axial shaking of the rotor magnet 2, caused by external vibrations, can be restrained, thereby preventing errors in magnetism detection by the Hall element 4 from being generated and protecting the device from becoming incapable of detection.

Further, as shown in FIG. 3(c), the arm sections 9a and 9b of the transmission member 9 define an angle δ-1 that is smaller than 180° to thereby exhibit a fan-like configuration that is bent toward the opening 8a, thereby enabling the transmission member 9 to be effectively arranged in a small range.

In the case of a lens barrel equipped with a light quantity control device of this embodiment, the coil space of the external excitation type motor can be arbitrarily set, so that an arcuate driving section as shown in FIG. 3(a) is possible, whereby it is possible for the drive section to be accommodated in the dead space between the optical space and the lens barrel space. Further, since the light-quantity control members 6 and 7 make a linear movement toward each other, it is possible to provide guide bars in the space inside the lens barrel, thereby reducing the size of the lens barrel. At the same time, the mounting of the device in the lens barrel can be effected through insertion from the back side, thereby facilitating the operations of maintenance, correction, assembly, etc.

Due to the fan-like configuration of the transmission member 9 as shown in FIG. 3(c), it is possible to impart an arcuate configuration to the outer periphery of the driving section for causing the light-quantity control members 6 and 7 to make a linear movement, thereby enabling the driving section to be accommodated in the arcuate dead space of the lens barrel.

Figure 4:
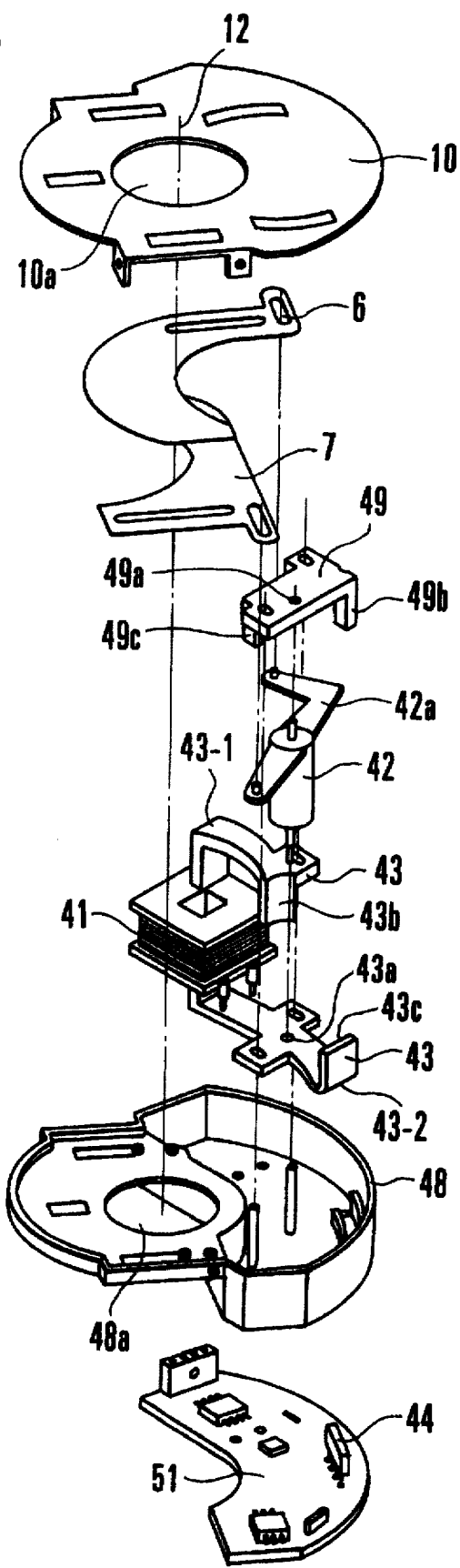
FIG. 4 is an exploded perspective view of a light-quantity control device according to a second embodiment of the present invention.
Figure 5:
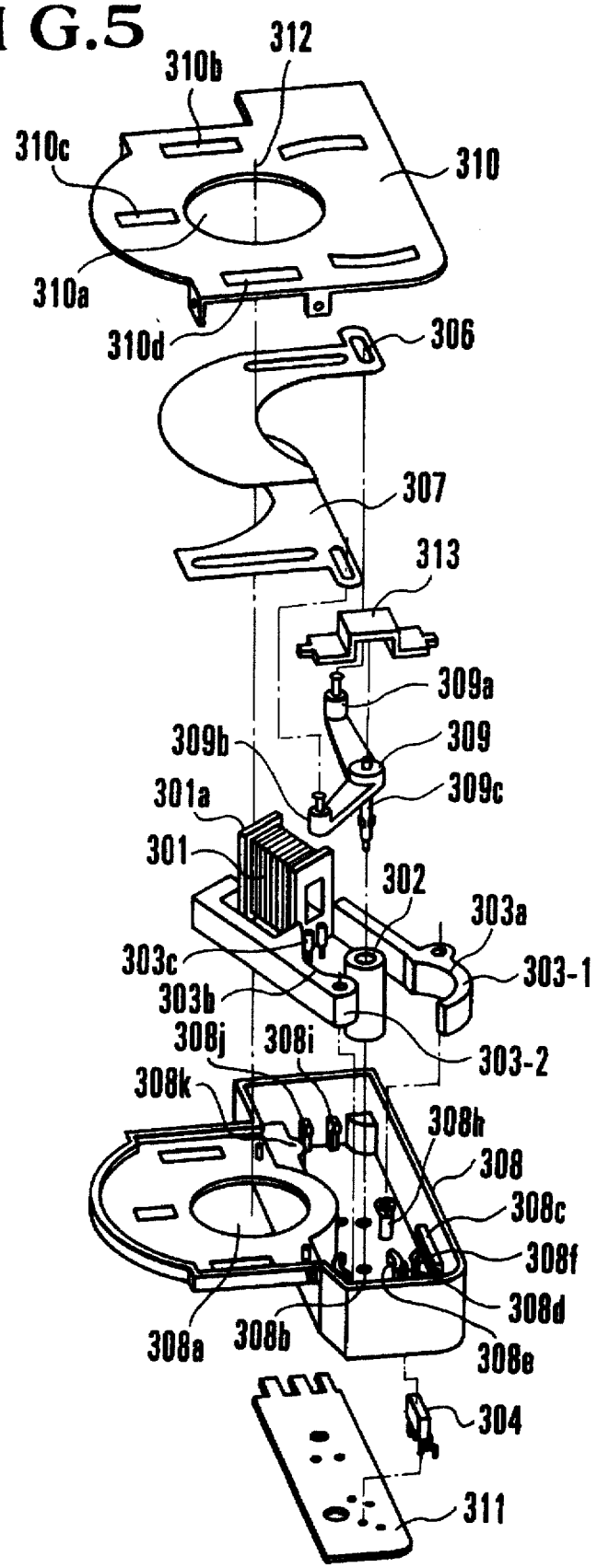
FIG. 5 is an exploded perspective view of a light-quantity control device according to a third embodiment of the present invention.

FIG. 4 shows the second embodiment of the present invention. In the following, only those sections of the second embodiment differing from the first embodiment shown in FIG. 3(a) will be described, and a description of the remaining sections will be omitted.

Numeral 43 indicates a stator yoke comprising stator yoke sections 43-1 and 43-2 having main magnetic poles 43b and 43c and an interpole yoke section 49 having interpoles 49b and 49c. A bobbin around which a driving coil 41 is wound is attached to a section where the stator yoke sections 43-1 and 43-2 engage with each other along the dimension of the optical axis. A rotor magnet 42 is arranged in these magnetic poles and interpoles with a fixed gap therebetween, and bearing holes 43a and 49a for rotatably supporting the shaft section of the rotor magnet are formed in the stator yoke section 43-2 and the interpole yoke section 49. Since the operation, etc. of the interpole yoke section 49 have already been described above, an explanation thereof will be omitted. In this embodiment, the rotor magnet 42 is urged by detent torque in such a way that the light-quantity control members 6 and 7 are closed.

Numeral 44 indicates a Hall element, which is attached to a printed circuit board 51, on which a drive circuit as shown in FIG. 1 is mounted, in such a way as to extend along the dimension of the optical axis.

The rotor magnet 42 consists of a plastic magnet composed of a transmission member 42a and an axle 42b that are integrally formed together. The rotor magnet is radially 2-pole magnetized.

FIGS. 5 through 9(a) and 9(b) are diagrams illustrating the third embodiment of the present invention. The light-quantity control device shown in the drawings uses a so-called external excitation type motor as the drive source.

Numerals 303-1 and 303-2 indicate stator yokes, which are arranged along a dimension perpendicular to an optical axis 312. A coil bobbin 301a around which a coil 301 is wound is attached to the yoke 303-1. Numeral 302 indicates a rotor magnet arranged in a circumferential section formed at the forward end of the stator yokes 303-1 and 303-2. The rotor magnet is radially 2-pole magnetized. Formed in the circumferential section of the stator yoke 303-1 is a magnetic pole 303a, and, formed in the circumeferential section of the stator yoke 303-2 is a magnetic pole 303b having an open angle which is smaller than that of the magnetic pole 303a and which is not smaller than 90°. The magnetic pole 303b is formed at a position shifted from the position where it faces the magnetic pole 303a. The side 303c of the magnetic pole 303b on the opposite side of the shifting is formed so as to be inclined toward the magnetic pole 303a.

In this embodiment, an optimum detent torque in one direction is generated with respect to the rotor magnet 302 by the values of the open angles of the magnetic poles 303a and 303b and the side surface 303c of the magnetic pole. In this embodiment, the rotor magnet 302 is urged so as to close the light-quantity control members 306 and 307 by the detent torque, so that there is no need to use a return spring as in the prior art.

Numeral 309 indicates a transmission member composed of a pair of arm sections 309a and 309b and an axle 309c which are formed as an integral unit. The axle 309c is fastened to the axial hole of the rotor magnet 302. Operating pins formed at the forward ends of the pair of arm sections 309a and 309b are engaged with engagement holes of the light-quantity control members 306 and 307. By the rotation of the rotor magnet 302, the light-quantity control members 306 and 307 are displaced so as to be opposed to each other to thereby diminish the aperture diameter, or moved away from each other to thereby enlarge the aperture diameter, whereby the incident light quantity for the lens is adjusted.

Numeral 308 indicates a base plate. Formed on the back side of the base plate 308 are: an opening 308a; engagement claws 308h, 308i, 308j, 308k and 308L for engaging and retaining the stator yokes 303-1 and 303-2; a bearing 308b for rotatably supporting one axial end of the axle 309c fixed to the rotor magnet 302; a Hall element opening 308d facing the Hall element 304; engagement claws 308e and 308f for engaging and retaining the Hall element 304; guide pins 308u and 308x fitted into elongated holes for supporting and guiding formed in the light-quantity control members 306 and 307; support rails 308y, 308z and 308w for supporting the light-quantity control members through a step provided along the dimension of the optical axis for each light-quantity control member; engagement claws 308c and 308g for engaging and supporting a bearing cap 313 rotatably supporting the other axial end of the axle 309c; and support sections 308m, 308p and 308n for engaging and supporting a printed circuit board 311. A motor section is fitted into a linear section of the base plate 308 perpendicular to the radial dimension of the optical axis. The light-quantity control members 306 and 307 are mounted from the same direction as the motor section. The opening on the front side of the base plate 308 is covered with a case 310 which has an opening 310a and support rails 310b, 310c and 310d for supporting the light-quantity control members 306 and 307 through steps provided for each of them along the dimension of the optical axis and which prevent intrusion of dust and the like from the outside.

Figure 8A:
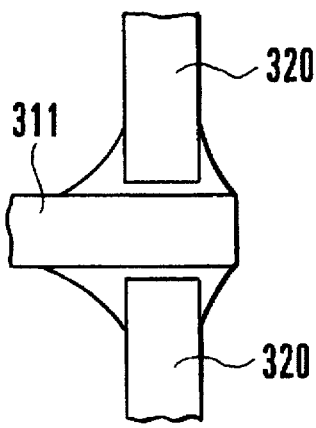
FIGS. 8(a) and 8(b) are diagrams showing how the light-quantity control device of FIG. 5 is connected to a printed circuit board.
Figure 8B:
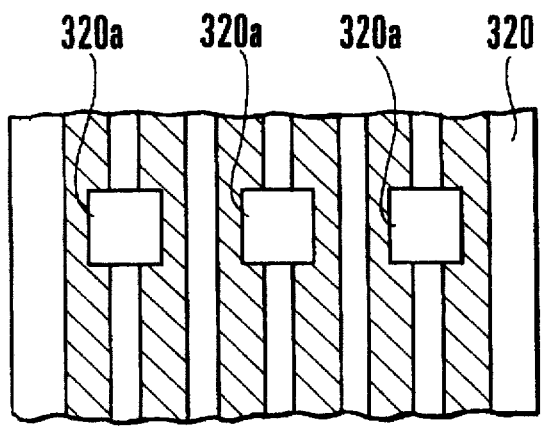

A Hall element 304 is mounted in an upright position on the printed circuit board 311. Land sections 311a and 311b for performing signal exchange with the control circuit section of the camera are formed as comb-teeth-like members and inserted into a hole 320 of a printed circuit board 311 of the control circuit of the camera, and soldered for conduction and secured in position as shown in FIGS. 8(a) and 8(b). In particular, apart from the above function, the land section 311b also serves as a check land for characteristic operation, etc. as a test pattern.

Figure 9A:
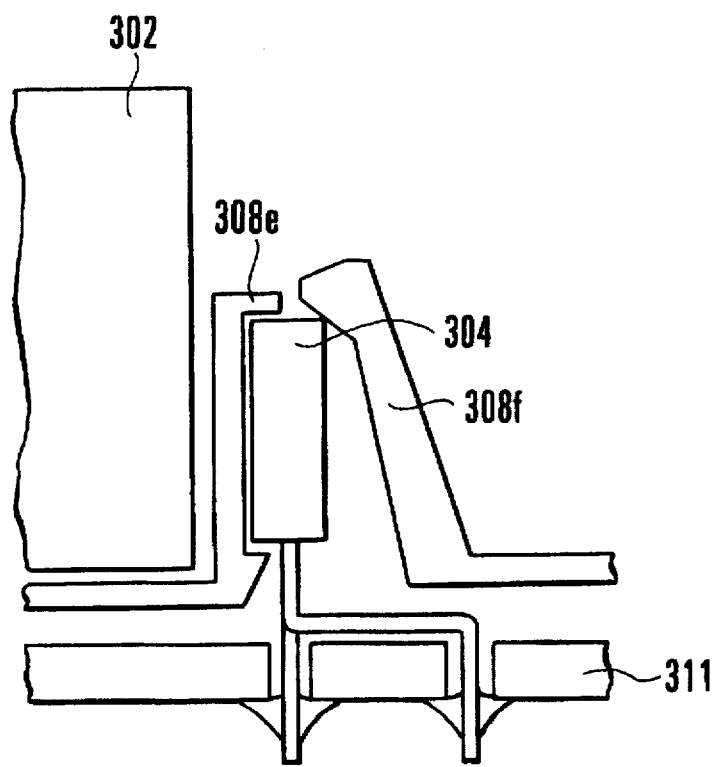
FIGS. 9(a) and 9(b) are diagrams showing the light-quantity control device of FIG. 5 with a Hall element attached thereto.
Figure 9B:
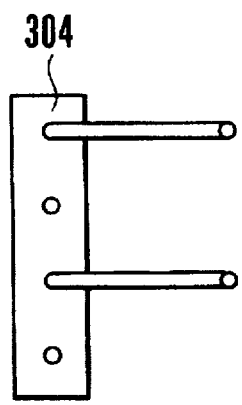

In this printed circuit board, a connector, intermediate interface member and the like are not needed, so that defective contact, noise source, etc. are eliminated, and a highly reliable connection is possible. Further, there is also an effect of preventing resonance due to oscillations generated when the automatic focusing motor, the zoom motor, etc. are driven. In particular, in the speed control system of this embodiment, in which the output of the Hall element is differentiated, it is important that the output of the Hall element should be free from noises. The terminals of the Hall element 304, mounted on the printed circuit board 311, include a terminal which is linearly extended and a terminal which is bent, as shown in FIGS. 9(a) and 9(b), whereby the land interval of the terminals is enlarged, and the Hall element 304 is prevented from falling when it is set upright at a position spaced apart from the printed circuit board 311, thereby enabling detection at a stable position.

Figure 11A:
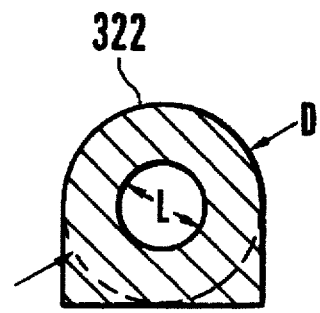
FIGS. 11(a), 11(b) and 11(c) are diagrams showing the external dimensions of the light-quantity control device of FIG. 5 combined with the lens barrel and deck section of a video camera.
Figures 11B, 11C:
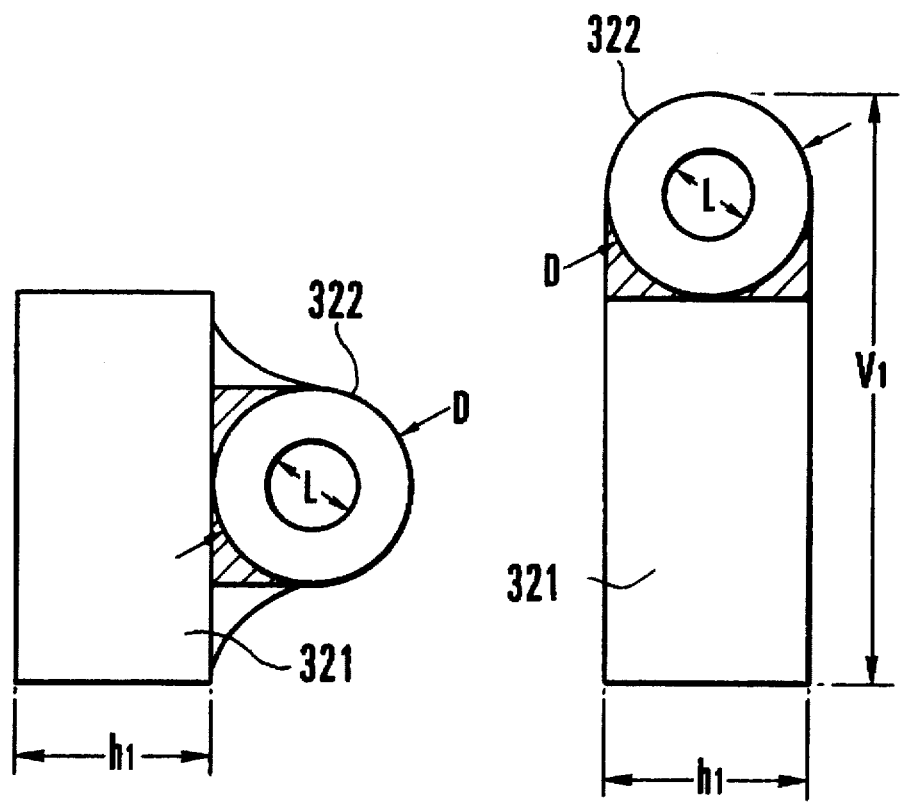

FIGS. 11(a) through 11(c) illustrate the dead space when a lens barrel section 322 is mounted on a camera deck section 321. Symbol L indicates an optical space; symbol D indicates the lens barrel space; numeral h1 indicates the camera deck width; and numeral V1 indicates the deck height plus the lens barrel space. As indicated by the hatching, the dead space consists of the sum of a lens barrel dead space, which is a value obtained by removing the optical space L from the lens barrel space D, and the dead space between the camera deck section and the lens barrel space.

Figure 6:
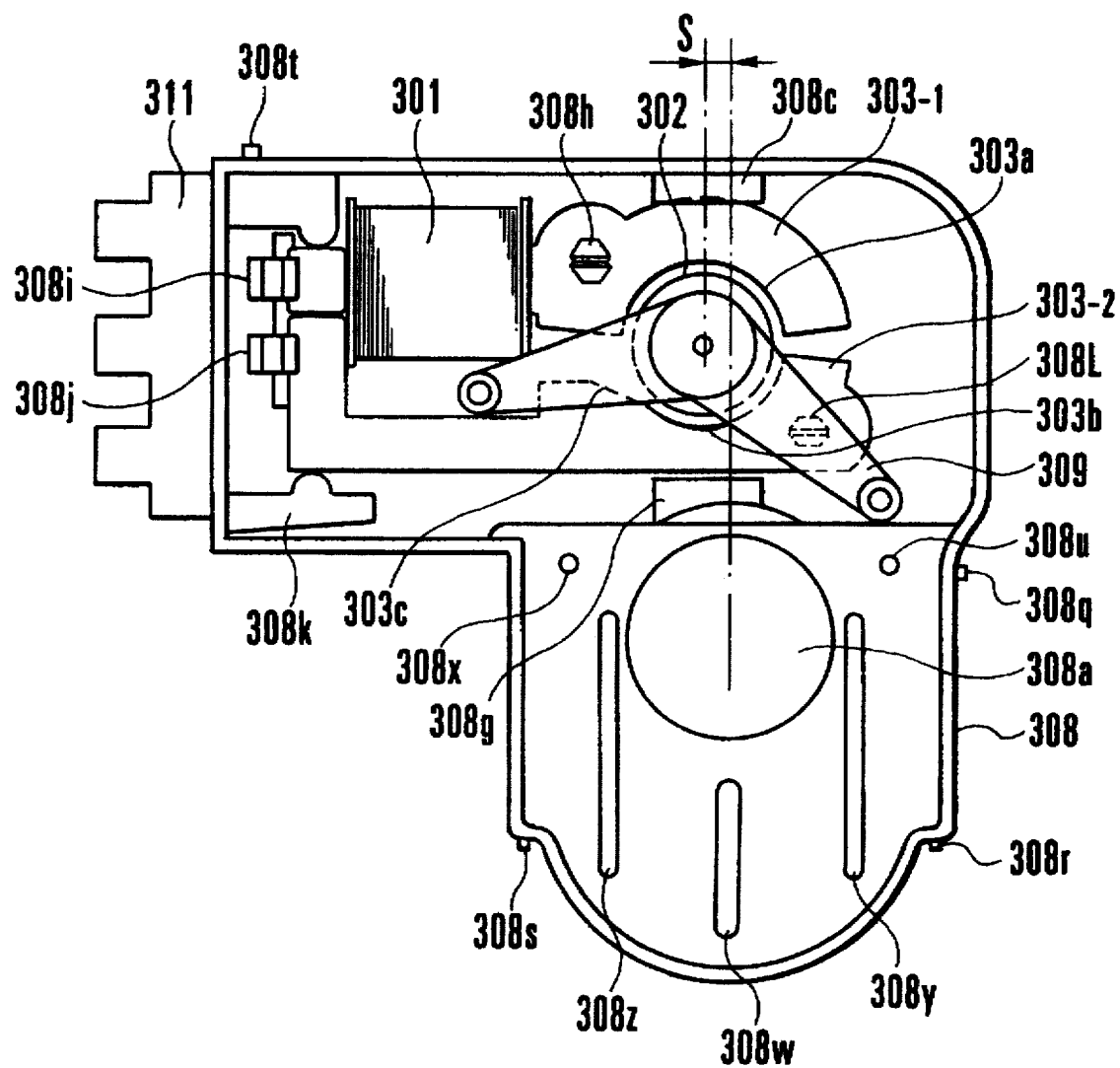
FIG. 6 is a plan view of the light-quantity control device of FIG. 5.
Figure 7:
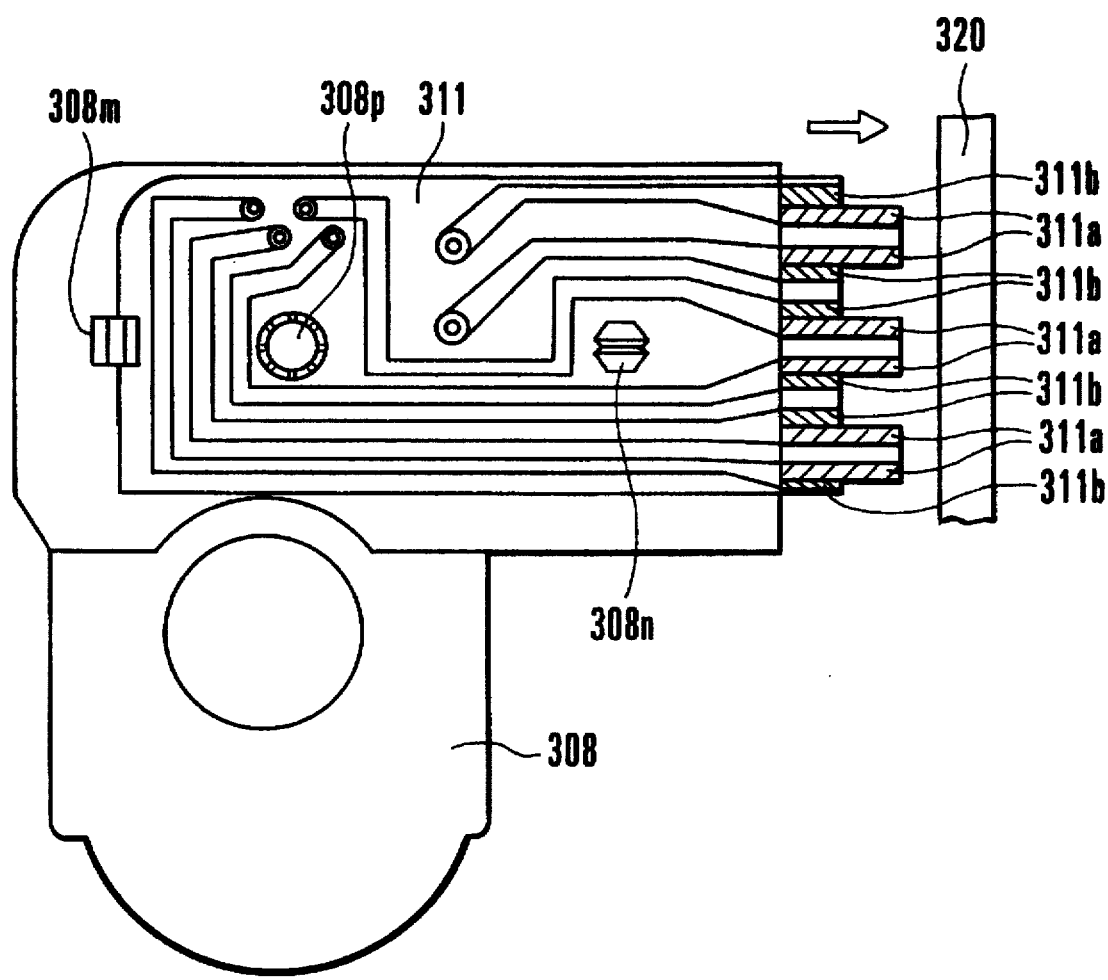
FIG. 7 is a rear view of the light-quantity control device of FIG. 5.
Figure 10A:
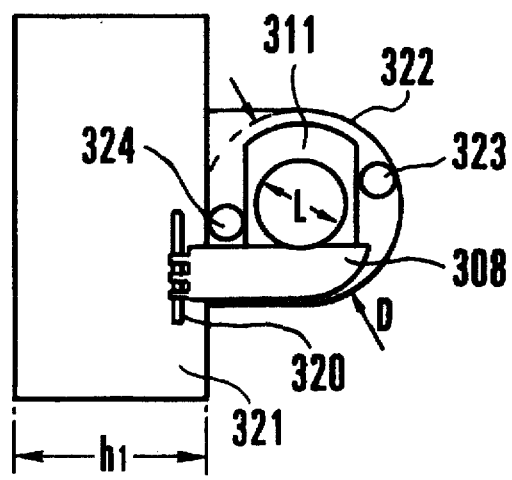
FIGS. 10(a) and 10(b) are diagrams showing the external dimensions of the light-quantity control device of FIG. 5 incorporated in a video camera.
Figure 10B:
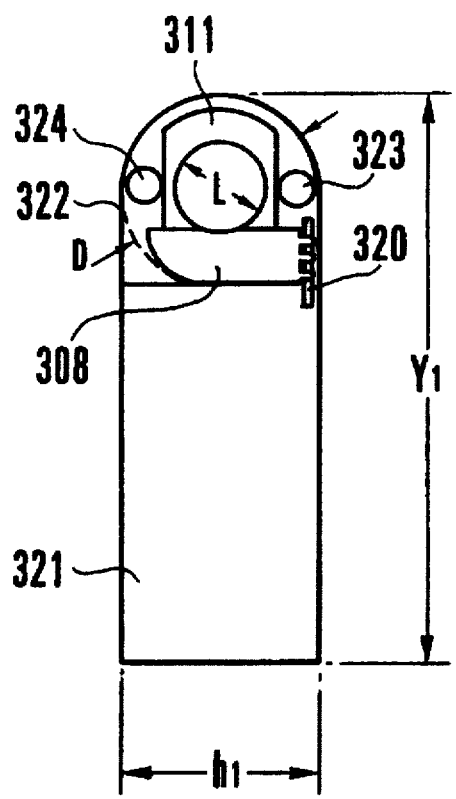

FIGS. 10(a) and 10(b) show the light-quantity control device of this embodiment as incorporated in the above dead space. Numerals 323 and 324 indicate guide bars for movably supporting the lens. Since the light-quantity control members 306 and 307 thus make a linear movement in opposite directions toward each other, it is possible to provide the guide bars in the lens space inside the lens barrel. As shown in FIG. 6, the drive section is arranged perpendicular to the direction in which the light-quantity control members 306 and 307 make a linear movement. By shifting the center of rotation of the rotor magnet 302 from the center of optical axis by a dimension S, it is possible to realize a substantially L-shaped light-quantity control device, which can be accommodated in the above dead space.

That is, the size of the camera as a whole can be reduced, and, at the same time, the mounting of the light-quantity control device in the lens barrel can be effected through insertion from the back side. This structure, which is suitable for the connection and fastening of the printed circuit board 311, facilitates the operations of maintenance, correction, replacement, assembly, etc.

Next, a video camera equipped with a light-quantity control device constructed as described above will be described with reference to the block diagram of FIG. 2.

Incident light on the photographic lens is transmitted through the opening defined by the light-quantity control members 6 and 7, and effects image formation on a light-quantity detecting device 105 consisting of CCD. The light signal is converted to an electric signal and output as a video signal YS.

Upon receiving this video signal YS, a drive amount setting means 108 sets drive amount information VP for the light-quantity control members 6 and 7 such that the incident light quantity has the proper value on the basis of operating amount information from a detection means 200 and a table set in a memory 109. The drive amount information is output to a comparison means 202.

The comparison means 202 excites the driving coil 1 of a drive source 201 on the basis of the drive amount information VP to rotate the rotor magnet 2 through the stator yoke 3 by the attraction and repulsion of the rotor magnet 2. When the rotor magnet 2 rotates, the light-quantity control members 6 and 7 make a linear movement in opposite directions toward each other through the transmission member 9, thereby adjusting the incident light quantity to obtain a proper exposure amount. The range of rotation for the transmission member 9 is restricted by the base plate 8, and the rotor magnet 2 rotates within a range not larger than 360°/P (P: the number of poles, which is an integer of 2 or more) (in this embodiment, the rotor magnet 2 is 2-pole magnetized, so that rotation is permitted within a range of 180°).

When the rotor magnet 2 rotates, the detection means 200, consisting of the Hall element 4, detects the rotational position of the rotor magnet 2 from the variation in the output thereof.

The positional information VF from the detection means 200 is nothing more than positional information, which means it can only serve to control the range of rotation for the rotor magnet 2 and cannot be used to rotate the rotor magnet at a low speed as is required in a video camera for light-quantity control. In view of this, in this embodiment, the positional information VF is input to a correction means 203, and corrected so as to be turned into driving speed information by a differentiating circuit of the correction means 203 before it is output to the comparison means 202.

In the comparison means 202, driving speed information VS that is in proportion to the rotation speed of the rotor magnet 2 is fed back with respect to the drive amount information VP, output from the drive amount setting means 108 by the input of the positional information VF, and drive control information VD, which is the difference therebetween, is output to the driving coil 1 of the drive source 201. The output of the detection means 200 is converted to a signal substantially linear, for example, between peak and peak of a sinusoidal wave, since the rotor magnet 2 is 2-pole magnetized and rotates within the angle range of 180°.

FIG. 1 shows a specific circuit configuration of the drive circuit comprising the comparison means 202, the drive source 201, the detection means 200, and the correction means 203, shown in FIG. 2.

This drive circuit performs a negative feedback control. The detection means 200 amplifies and adjusts the output of the Hall element 4 to output operating amount information VF. The correction means 203 has a differentiating circuit which differentiates the operating amount information VF to convert it to driving speed information VS. Symbol VR indicates a reference voltage. The comparison means 202 has an integration circuit which compares the driving speed information VS with the drive amount information VP and outputs the difference therebetween to the driving coil 1 as drive control information VD.

The operation of this driving circuit will be described with reference to FIGS. 12(a) through 12(d) which illustrate variations in the signals of the circuits in correlation to each other.

Figure 12A:
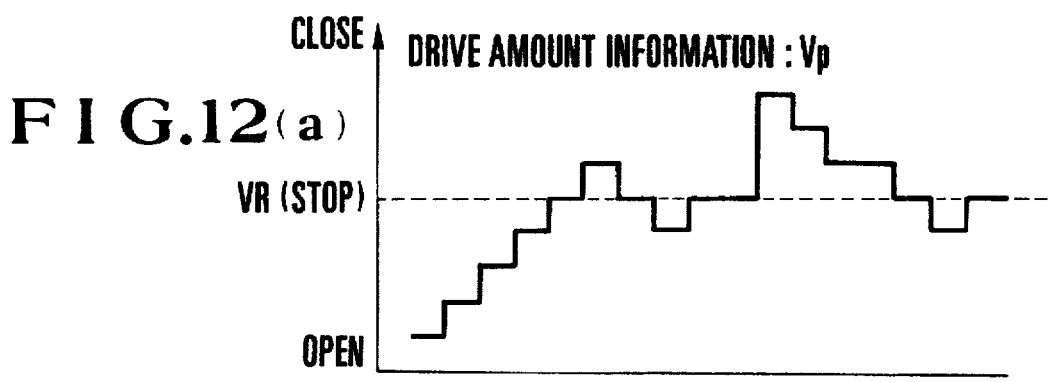
FIGS. 12(a), 12(b), 12(c) and 12(d) are diagrams showing the output waveforms of the signals in the circuit diagram of FIG. 1.

FIG. 12(a) shows drive amount information VP. The drive amount information VP is varied around the value of the reference voltage VR in accordance with variations in light quantity such that the light quantity YS always approaches a preset target value or that the operating amount information VF approaches a target value. When the light quantity is at the level of the reference voltage VR, the light-quantity control members are stopped. When the light quantity is at a level higher than the reference voltage VR, a close signal for closing the light-quantity control members is output, and, when the light quantity is at a level lower than the reference voltage VR, an open signal for opening the light-quantity control members is output. Accordingly, the larger the difference between the control amount of the light quantity YS or the like and the target value, the larger the difference in level between the reference voltage VR and the drive amount information VP.

Figure 12B:
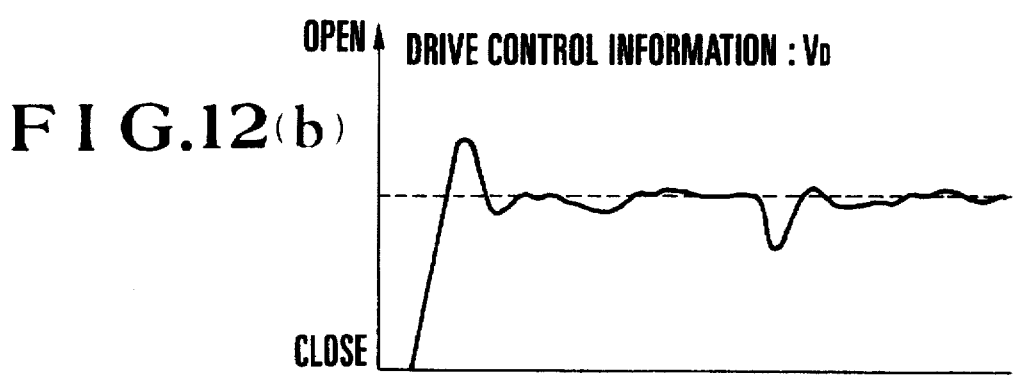

FIG. 12(b) shows drive control information VD. Drive control information VD, which is obtained by integrating the difference between the drive amount information VP and the driving speed information VS, is applied to the driving coil 1. Numeral $L_0$ indicates a voltage level corresponding to the return torque due to the detent torque. When the drive control information VD coincides with the voltage level $L_0$, the light-quantity control members are stopped. When the level of the drive control information VD is higher than the voltage level $L_0$, the light-quantity control members are driven in the opening direction, and, when the level of the drive control information VD is lower than the voltage level $L_0$, the light-quantity control members are driven in the closing direction.

Figure 12C:
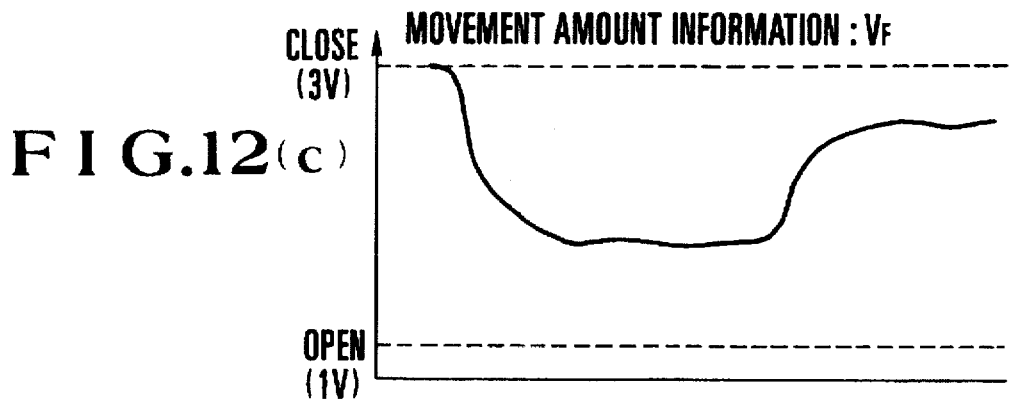

FIG. 12(c) shows operating amount information VF, which consists of information on the amount by which the rotor magnet 2 has operated in accordance with the drive control information VD. The operating amount information is detected linearly and directly by the Hall element 4. It is adjusted by an amplifier, for example, to 1 V at the open end, and 3 V at the closed end of the light-quantity control members. Its voltage level corresponds to the rotational position of the rotor magnet 2 and the aperture diameter of the light-quantity control members.

Figure 12D:
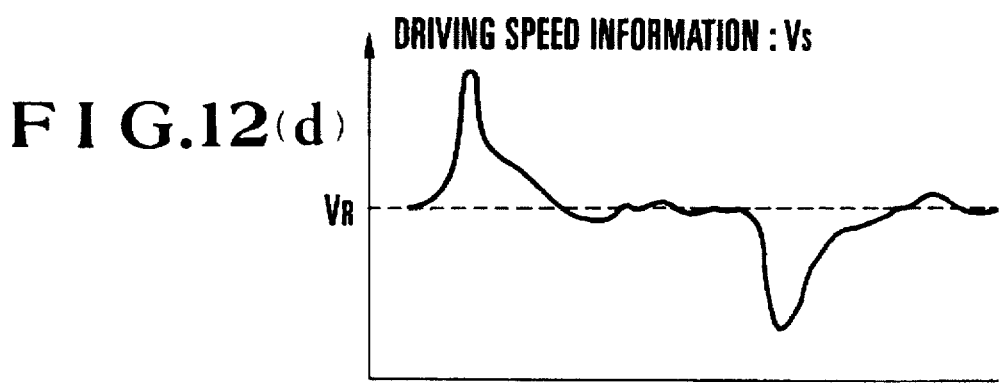

FIG. 12(d) illustrates driving speed information VS output from the correction means 203. This driving speed information VS is a signal obtained by differentiating the operating amount information VF. It is an output whose magnitude increases in proportion to the changing speed of the operating amount information VF (i.e., the gradient of the operating amount information VF). Accordingly, it is a signal in proportion to the rotation speed of the rotor magnet 2. When the driving speed information VS coincides with the reference signal VR, the speed is zero. When the signal is larger than the reference signal VR, a speed in the opening direction is detected. When the signal is smaller than the reference signal VR, a speed in the closing direction is detected.

In this driving circuit, the drive control information VD rises in accordance with the open signal of the drive amount information VP to exceed the voltage level $L_0$, with the result that the rotor magnet 2 starts to rotate, and is accelerated. If left as is, this rise in drive control information VD would cover a small range of rotation in a matter of several milliseconds to reach the open end past the target value. On the other hand, the close signal of the drive amount information VP would cause a step movement to the close end, making approach to the target value impossible.

In view of this, driving speed information VS that is in proportion to the changed speed of the operating amount information VF is negatively fed back to the drive amount information VP, and the difference therebetween is obtained as drive control information VD.

When the rotor magnet 2 starts to rotate and is accelerated, the operating amount information VF undergoes a rapid change with it, with the result that the driving speed information VS rises rapidly. As a result of a comparison of this driving speed information VS with the drive amount information VP, the drive control information VD starts to decrease to reduce to the drive control information VD to a level lower than $L_0$, thereby generating a torque in the closing direction. As a result, the rotation speed of the rotor magnet 2 decreases so as to stop it. However, since the speed change of the operating amount information also becomes milder, the driving speed information VS also approaches the reference signal VR.

However, as a result of a comparison of this driving sped information VS with the drive amount information VP, the drive control information VD rises to attain a level higher than $L_0$, and the rotor magnet 2 starts to be accelerated again.

Due to this negative feedback operation, it is possible to stably control a one-phase excitation type motor entailing step movements at creep speed.

Therefore, due-to the operation of this embodiment, the rotor magnet can move within a small range of rotation at low speed and smoothly, thereby eliminating unstable operations in light-quantity control, such as hunting. As a result, it is possible to obtain an external excitation type light-quantity control device which is capable of a fine and smooth light-quantity control.

Further, this embodiment employs an auto-closed system in which the rotor magnet 2 is urged so as to close the light-quantity control members 6 and 7 by a proper detent torque set by a balancing means and adjusting means for the magnetic poles of the stator yoke 3. When the driving coil 1 is not being energized, this urging force causes the light-quantity control members to automatically return to the closed position. Of course, this should not be construed restrictively. It is also possible to employ, for example, a system in which the detent torque is balanced substantially completely, and a system in which the light-quantity adjusting member is opened and closed by switching the current to be passed in its coil.

Next, the detent torque balancing/adjusting means used in this embodiment will be described with reference to FIGS. 13(a), 13(b) and 14.

Figure 13A:
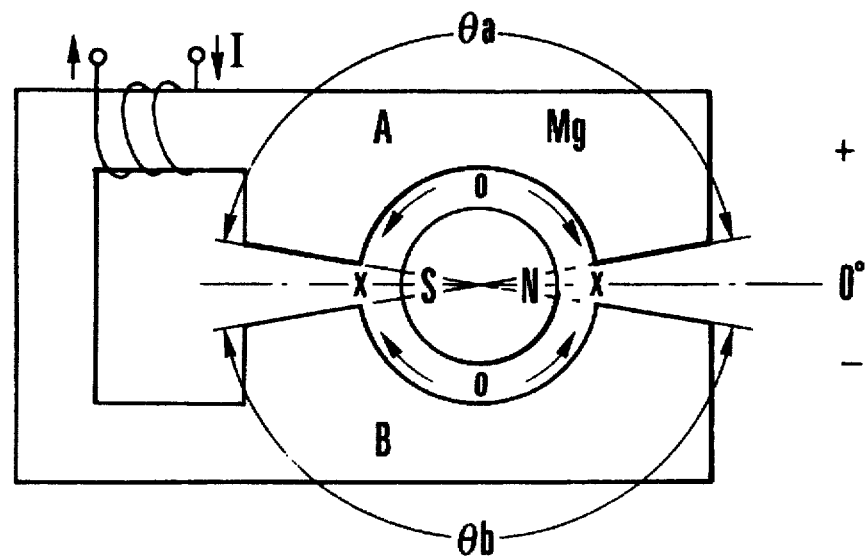
FIGS. 13(a) and 13(b) are plan views showing detent torque balancing/adjusting means in the third embodiment.
Figure 13B:
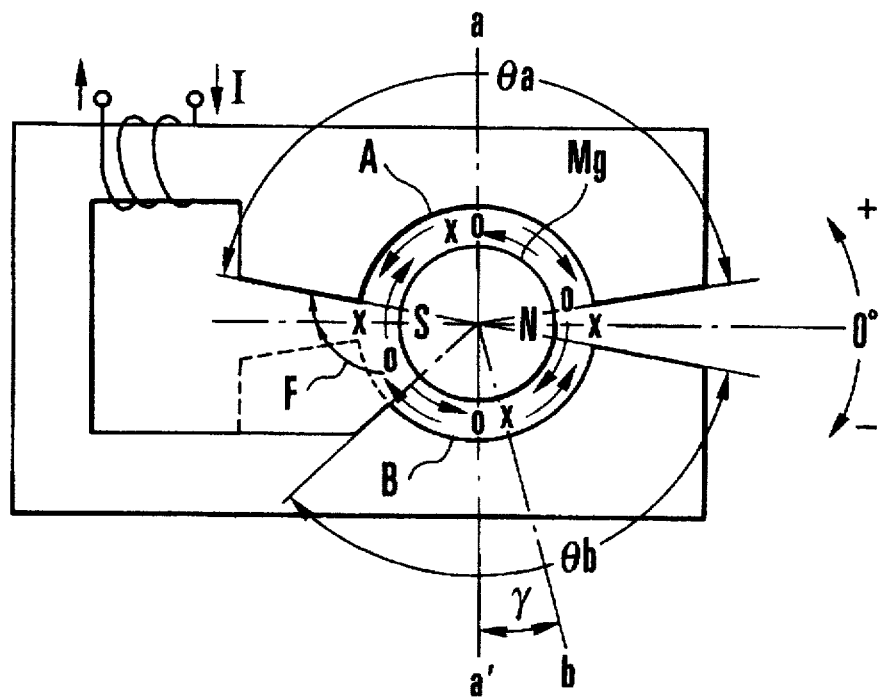

FIGS. 13(a) and 13(b) show that the detent torque is balanced by the open angles and opposite angular positions of the magnetic poles. Assuming that the number of magnetic poles magnetized by the rotor magnet Mg is P (in this embodiment, P=2), the open angles θa and θb of the magnetic poles A and B, forming a uniform gap with the rotor magnet, satisfy the following relationship: θa=θb>360°/2P. When θa and θb are symmetrically opposed to each other, a detent torque acts in a polarity that is in a direction in which the SN magnetic poles of the rotor magnet is perpendicular to the opposed sections of the yoke as shown in FIG. 13(a).

When, as shown in FIG. 13(b), the open angle θb of the magnetic pole B is adjusted so as to satisfy the relationship:

$$\theta a > \theta b > 360°/2P$$

and the central position b of the open angle of the magnetic pole B is shifted by an angle γ with respect to the opposed position a-a' of the center of the open angle of the magnetic pole A, the magnetic flux F which has been flowing through the magnetic pole B flows into the magnetic pole A to thereby generate an opposite-phase detent torque. (When the magnetic poles are not shifted relative to each other, this component is generated on either side, and the opposite-phase detent torque is balanced.) When the open angle is 360°/2P or more, the resultant detent torque is not much different from that in FIG. 13(a). Due to the opposite-phase detent torque generated by this asymmetrical section, the detent torque generated in the magnetic pole A (and the magnetic pole B) can be balanced substantially completely. Symbol X indicates a stable point, and symbol O indicates an unstable point.

Figure 14:
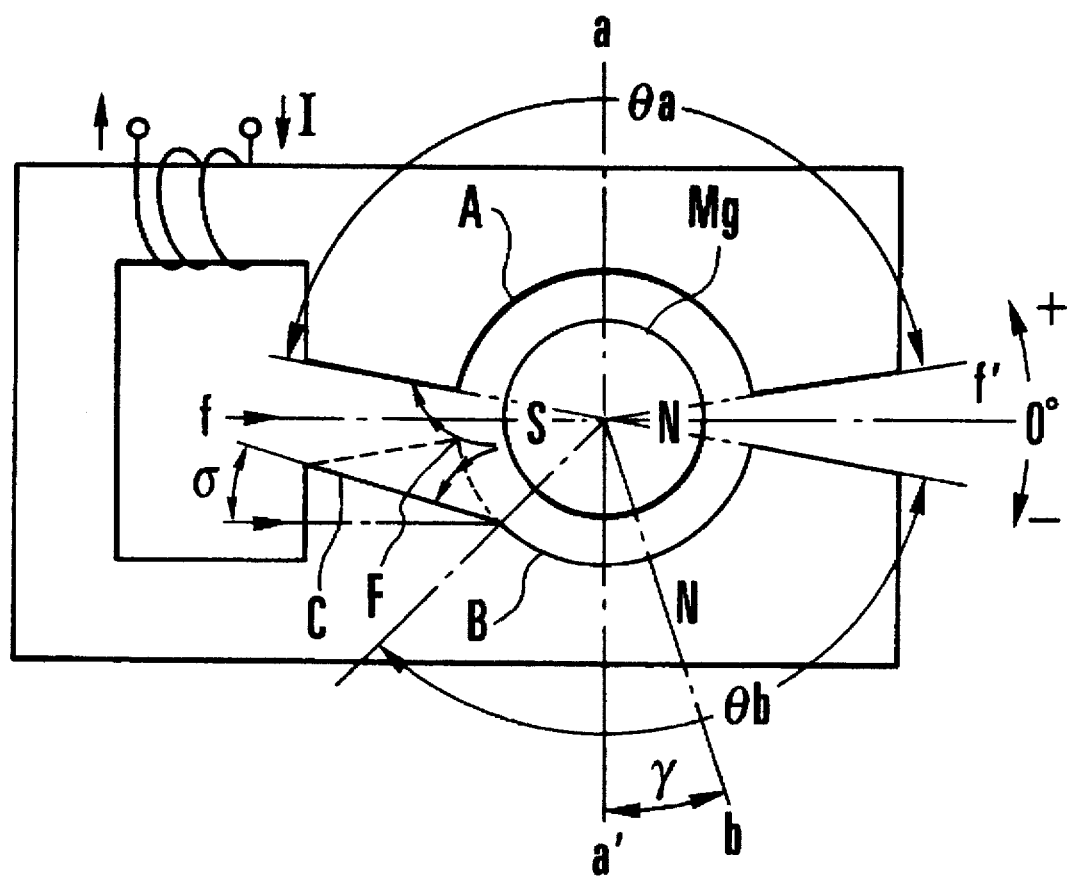
FIG. 14 is a plane view showing a modification of the embodiment shown in FIG. 13(b)

FIG. 14 shows a modification of the embodiment shown in FIG. 13(b). In this modification, the embodiment shown in FIG. 13(b) is modified such that a side C of the magnetic pole B which is shifted from the opposed position of the magnetic pole A and which is on the side opposite to the direction of rotation, is brought closer to the opposite magnetic pole A, and is inclined by an angle σ from a angle parallel to a plane f-f' extending through the center of the minimum gap of the magnetic poles A and B, whereby the amount of magnetic flux F flowing into the magnetic pole A is adjusted so as to obtain an optimum detent torque.

By this detent torque, the rotor magnet Mg is urged in the closing direction (the − rotating direction). In this case, the above shift angle γ is set to be an angle within the range of 360°/(2×2) in the opening direction (the + rotating direction).

Figure 15:
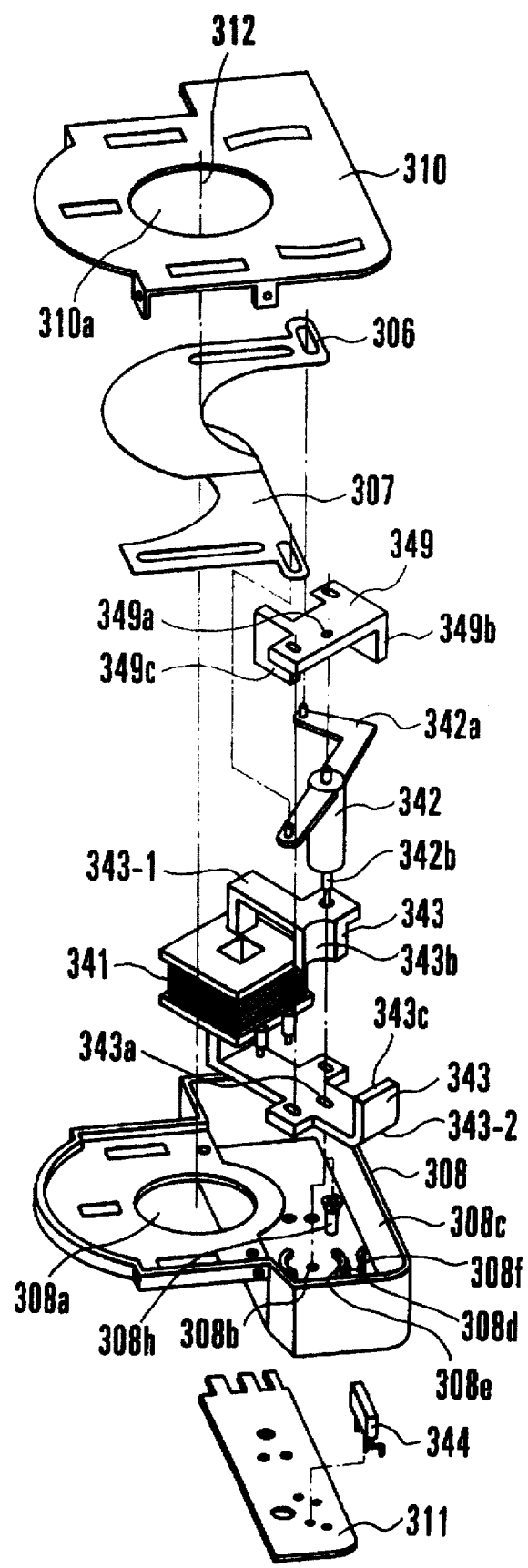
FIG. 15 is an exploded perspective view of a light-quantity control device according to a fourth embodiment of the present invention.

FIG. 15 shows the fourth embodiment of the present invention. In the following, only those components which are different from those of the third embodiment, shown in FIG. 5, will be described. A description of the remaining components will be omitted.

Numeral 343 indicates a stator yoke comprising stator yoke sections 343-1 and 343-2 having main magnetic poles 343b and 343c and an interpole yoke section 349 having interpoles 349b and 349c. A bobbin around which a driving coil 341 is wound is attached to a section where the stator yoke sections 343-1 and 343-2 engage with each other along the dimension of the optical axis. A rotor magnet 342 is arranged in these magnetic poles and interpoles with a fixed gap therebetween, and bearing holes 343a and 349a for rotatably supporting the shaft section of the rotor magnet are formed in the stator yoke section 343-2 and the interpole yoke section 349.

Numeral 344 indicates a Hall element, which is attached to a printed circuit board 311, on which a drive circuit as shown in FIG. 1 is mounted, in such a way as to extend along the dimension of the optical axis.

The rotor magnet 342 consists of a plastic magnet composed of a transmission member 342a and an axle 342b that are integrally formed together. The rotor magnet is radially 2-pole magnetized.

The open angles of the main magnetic poles 343b and 343c and the interpoles 349b and 349c are 360°/(2×2) or more, and the angle made by the main magnetic poles and the interpoles is shifted from the angular position of 360°/(2×2) in the closing direction of the rotor magnet 342 by an amount within the range of 360°/(2×2), whereby the detent torque is balanced and adjusted, and the rotor magnet 342 is urged in the closing direction by a proper returning force.

In the following, the principle on which the above-described means for setting and balancing the detent torque is based will be described with reference to FIGS. 16(a), 16(b), 17(a) through 17(d), 18(a) through 18(d), 19(a) through 19(d), 23(a) through 23(c), and 24(a) through 24(c).

FIGS. 16(a) and 16(b) show that the polarity of a detent torque can be reversed depending on the open angle of the magnetic pole. Assuming that the number of magnetic poles magnetized by the rotor magnet Mg is P (in this embodiment, P=2), when the open angle θ of the magnetic pole satisfies the relationship: $\theta_1 < 360°/2Pa$ detent torque acts in a polarity in a direction in which the SN magnetic poles of the rotor magnet is opposed to the yoke, as shown in FIG. 16(a). When $\theta_2 < 360°/2P$, a detent torque acts in a polarity in a direction in which the SN magnetic poles are perpendicular to the opposed sections of the yoke, as shown in FIG. 16(b). Symbol X indicates a stable point, and symbol O indicates an unstable point.

Figure 23A:
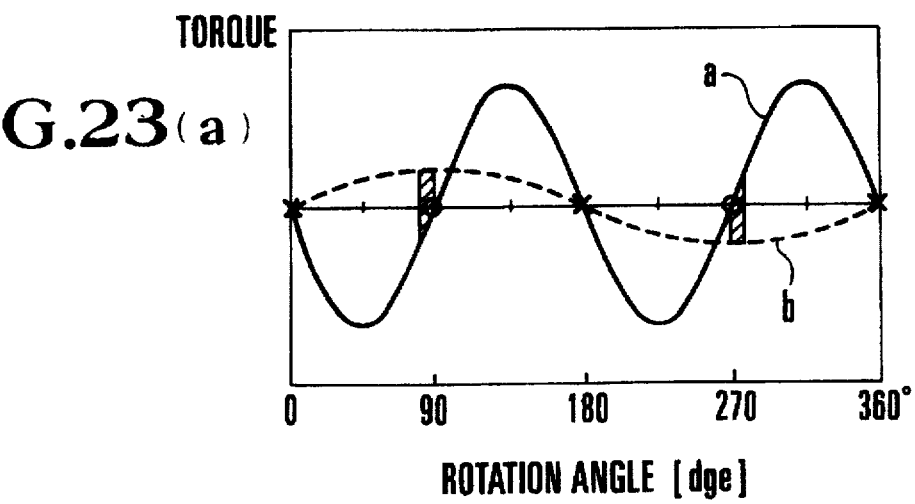
FIGS. 23(a), 23(b) and 23(c) show the relationship between rotation angle and detent torque, of which FIG. 23(a) corresponds to FIG. 16(a), FIG. 23(b) corresponds to FIG. 16(b)
Figure 23B:
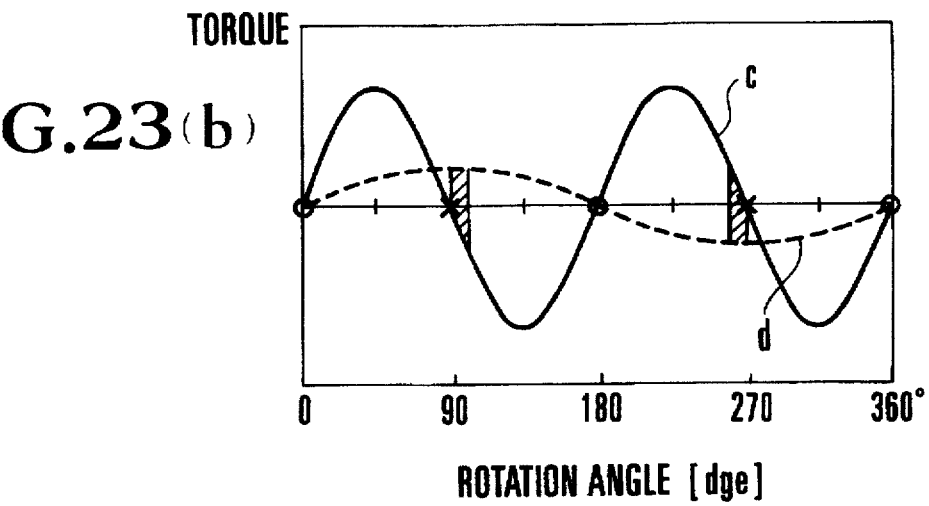
Figure 23C:
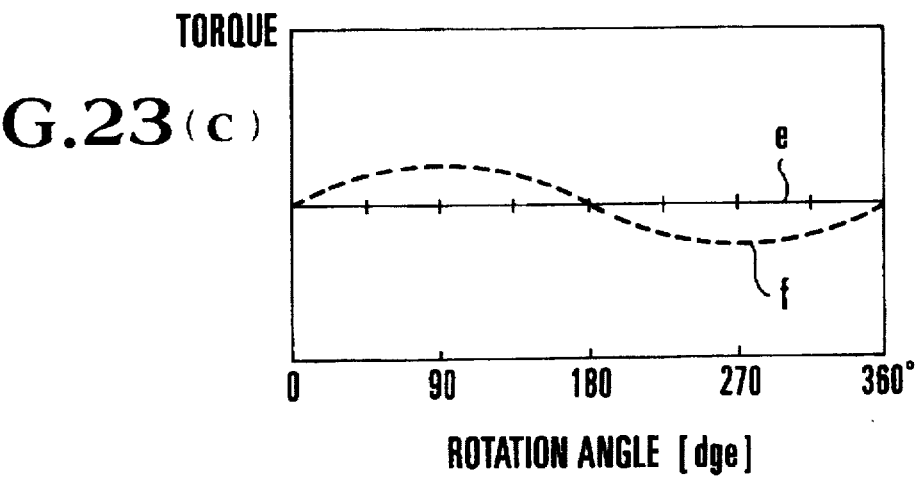

FIGS. 23(a) through 23(d) show this torque characteristic with respect to the rotation angle. The torque characteristic of FIG. 16(a) is shown in FIG. 23(a), and the torque characteristic of FIG. 16(b) is shown in FIG. 23(b). In the following, it will be assumed that the counterclockwise direction is the normal (opening direction), and that the NS position of the rotor magnet of FIGS. 16(a) and 16(b) is 0°. In FIGS. 23(a), 23(b) and 23(c), symbols a, c and e indicate detent torque, and symbols b, d and f indicate excitation torque due to the coil current I.

FIGS. 17(a) through 17(d) show detent torque balancing systems utilizing this detent torque characteristic.

Figure 17A:
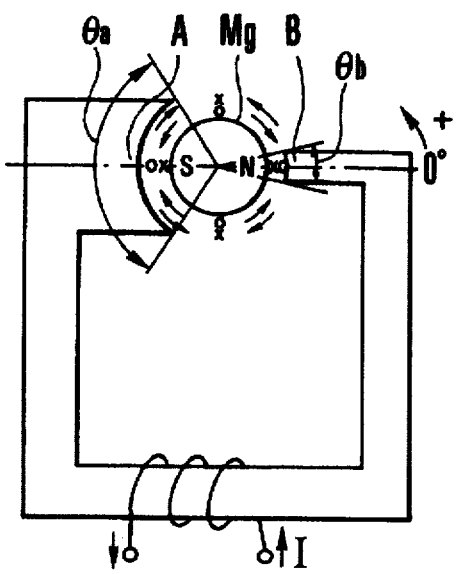
FIGS. 17(a), 17(b), 17(c) and 17(d) show a detent torque balancing system.

In FIG. 17(a), the open angle θb of the magnetic pole B is 360°/2P or less, and the open angle θa of the magnetic pole A is 360° or more. Regarding the respective detent torques, that of the magnetic pole B is as indicated by a in FIG. 23(a), and that of the magnetic pole A is as indicated by c in FIG. 23(b). Thus, forces of opposite polarities are combined, so that the detent torque of FIG. 17(a) can be substantially balanced as indicated at e in FIG. 23(c). In the case of a small excitation torque as indicated at b and d of FIGS. 23(a) and 23(b), the range in which driving is possible against the detent torque as indicated at a, c is a very small range indicated by hatching. However, in the case of FIG. 23(c), driving is possible within the range of 360°/P with a similar, very small torque as indicated at f.

Figure 17C:
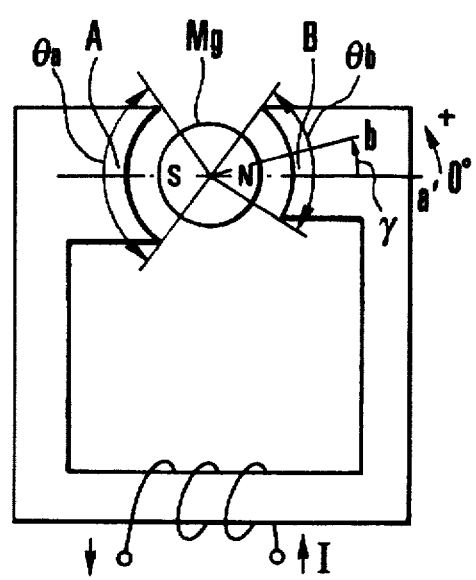
Figure 17B:
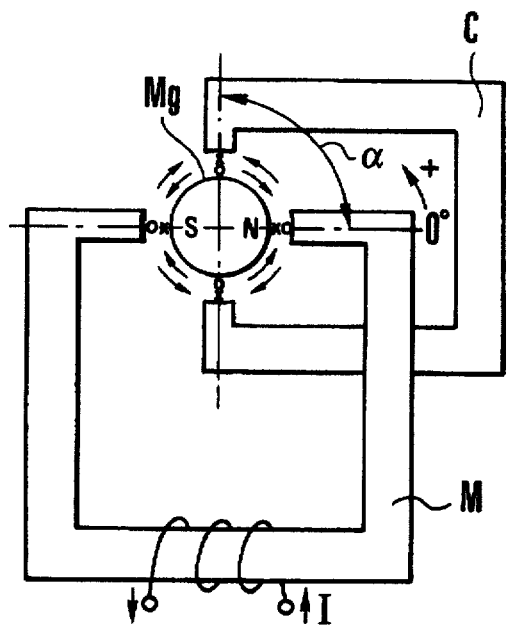

In FIG. 17(b), an interpole having the same open angle of 360°/2P or less, which is obtained by angularly shifting a magnetic pole of an angle α=360°/2P with respect to the main magnetic pole M, whereby the same effect as that of FIG. 17(a) is obtained. The detent torque due to the main magnetic pole M has the polarity a in FIG. 23(a), and the interpole C has the polarity c of FIG. 23(b). The resultant torque is a detent torque as indicated at e in FIG. 23(c), which means complete balancing of detent torque is substantially possible.

In FIG. 17(c), the open angle θa of the magnetic pole A is larger than 360°/2P, and the open angle θb of the magnetic pole B is larger than 360°/2P and shifted from the opposing position a-a' of the magnetic pole A by an angle γ. Since the open angles θa and θb are larger than 360°/2P, the polarity of the resultant detent torque is as indicated at c in FIG. 23(b), and, by shifting the opposing position of this magnetic pole, the polarity of the detent torque due to the asymmetrical section is as indicated at a in FIG. 23(a). Thus, the resultant detent torque is as indicated at e in FIG. 23(c), so that complete balancing is substantially possible.

Figure 17D:
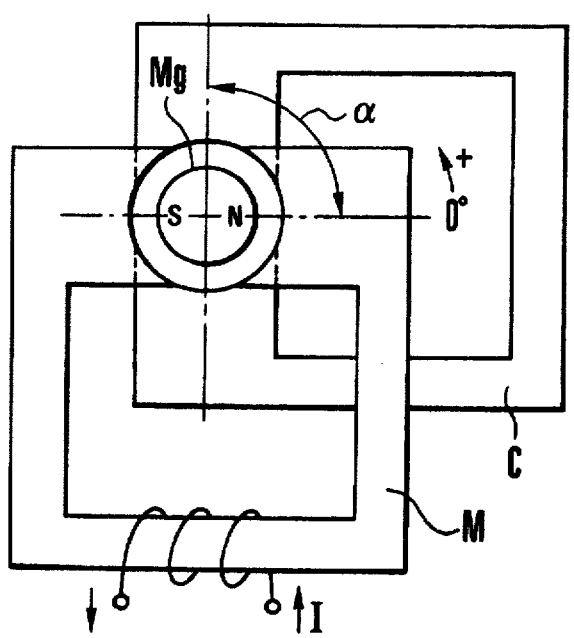

In FIG. 17(d), an interpole having the same open angle of larger than 360°/2P, is provided by shifting a magnetic pole of an angle α=360°/2P in a thrusting direction with respect to the main magnetic pole M, whereby the same effect as that of FIG. 17(b) is obtained. The detent torque due to the main magnetic pole M has a polarity as indicated at c in FIG. 23(b), and the interpole C has a polarity as indicated at c of FIG. 23(a). The resultant torque is a detent torque as indicated at e in FIG. 23(c), which means complete balancing of the detent torque is substantially possible.

FIGS. 18(a) through 18(d) show detent torque adjusting systems utilizing the above four balancing means.

Figure 18A:
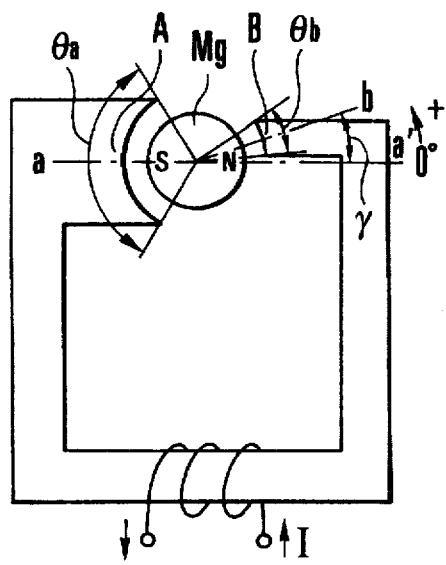
FIGS. 18(a), 18(b), 18(c) and 18(d) show a detent torque adjusting system.
Figure 24A:
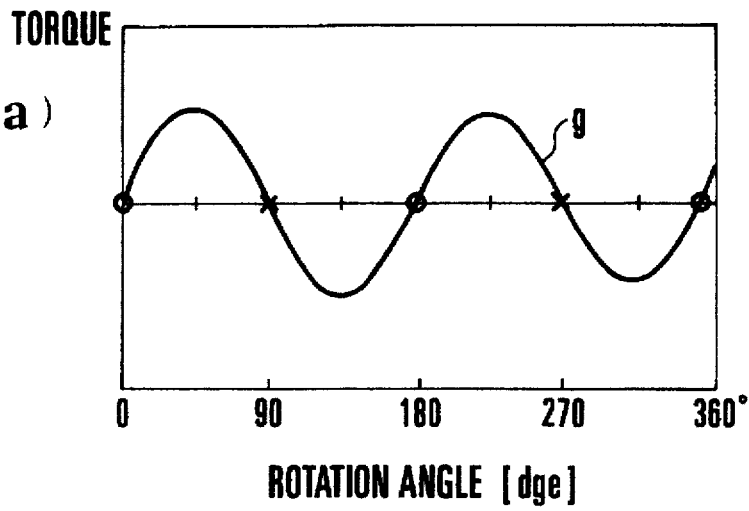
FIGS. 24(a), 24(b) and 24(c) are diagrams showing the relationship between rotation angle and torque in the detent torque balancing/adjusting means shown in FIGS. 18(a), 18(b), 18(c), 18(d), 19(a), 19(b), 19(c) and 19(d).
Figure 24B:
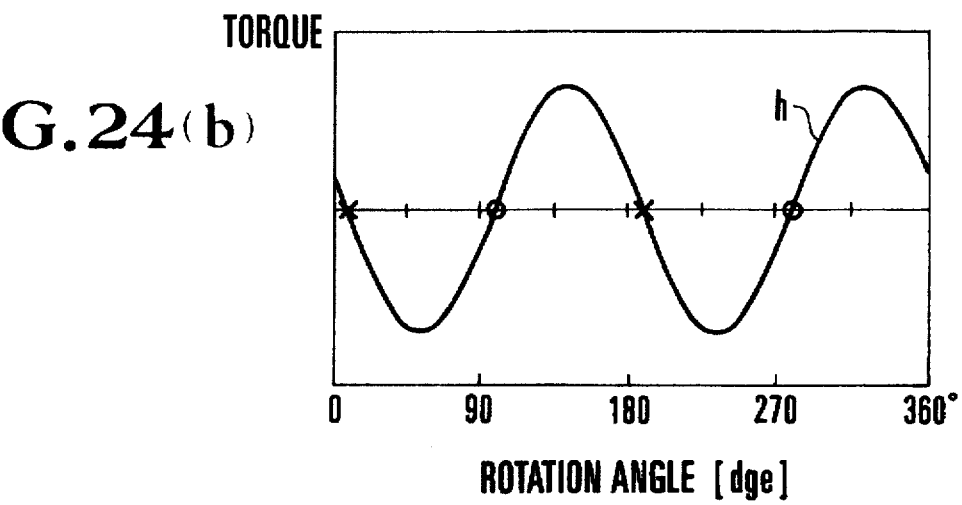
Figure 24C:
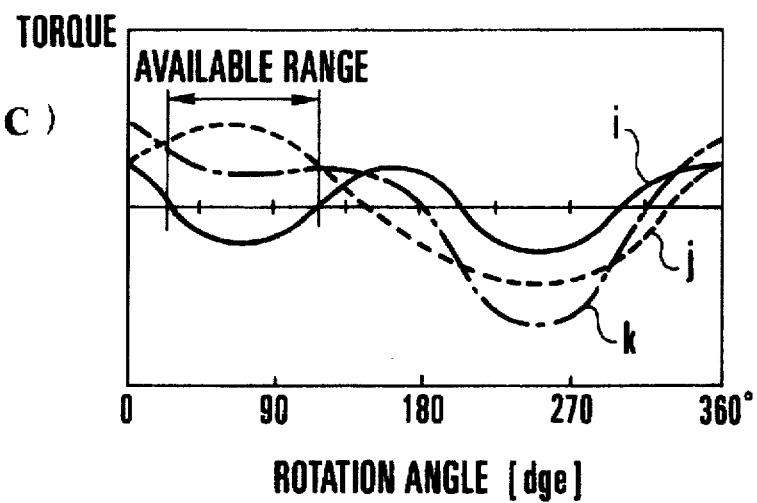
Figure 25A:
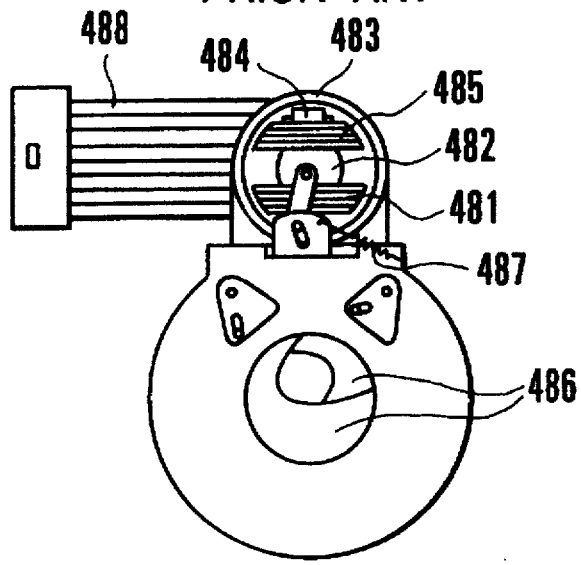
FIG. 25(a) shows a conventional light-quantity control device driven by an internal excitation type motor.
Figure 25B:
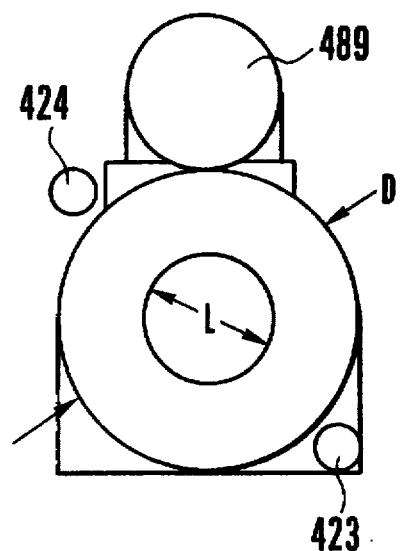
FIGS. 25(b) and 25(c) are diagrams showing external dimensions of a video camera in which the light-quantity control device shown in FIG. 25(a) is incorporated.
Figure 25C:
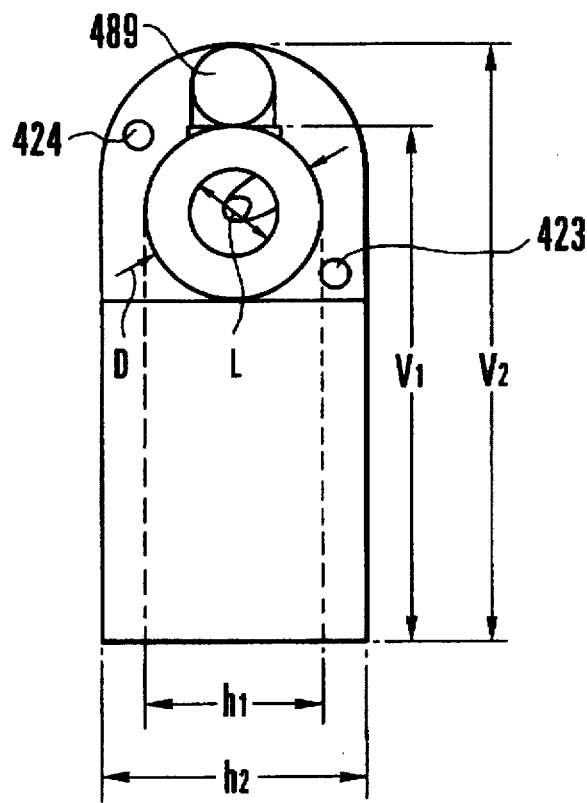
Figure 25D:
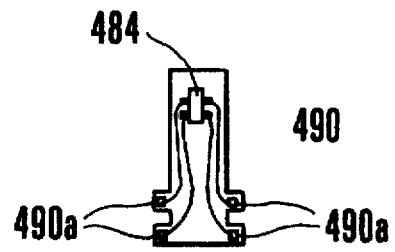
FIG. 25(d) is a diagram showing the Hall element shown in FIG. 25(a) mounted on a printed circuit board.
Figure 26:
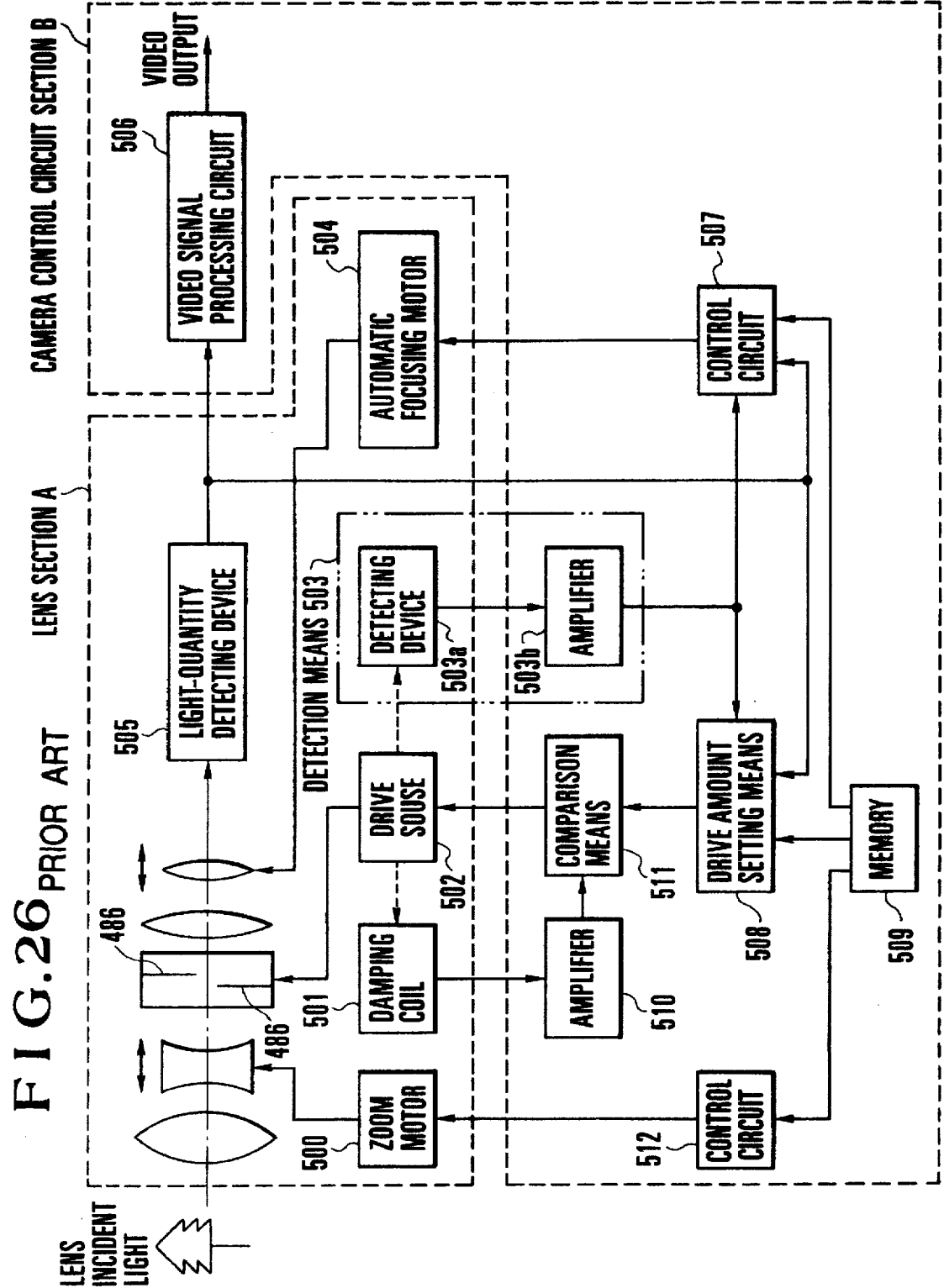
FIG. 26 is a block diagram of the video camera of FIG. 25(c).

In FIG. 18(a), the magnetic pole B in FIG. 17(a) is shifted by an angle γ in the positive rotating direction from a position where it is opposed to a magnetic pole A having a detent torque polarity as indicated at g in FIG. 24(a), whereby the phase of the detent torque in the magnetic pole B is shifted in the positive rotating direction as indicated at h in FIG. 24(b). By combining these two forces, a curve k as shown in FIG. 24(c) is obtained. Thus, the detent torque is balanced and a reduction in magnitude to approximately one third of the curve g, h is attained. Further, the phase is shifted such that the peak of excitation torque j and the peak of detent torque i substantially coincide with each other. The positive rotating direction corresponds to the direction of opening rotation of the rotor magnet Mg, and the negative rotating direction corresponds to the direction of closing rotation.

Figure 18C:
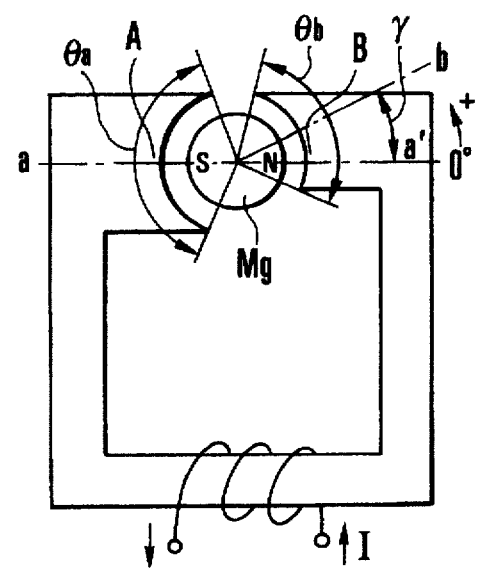
Figure 18B:
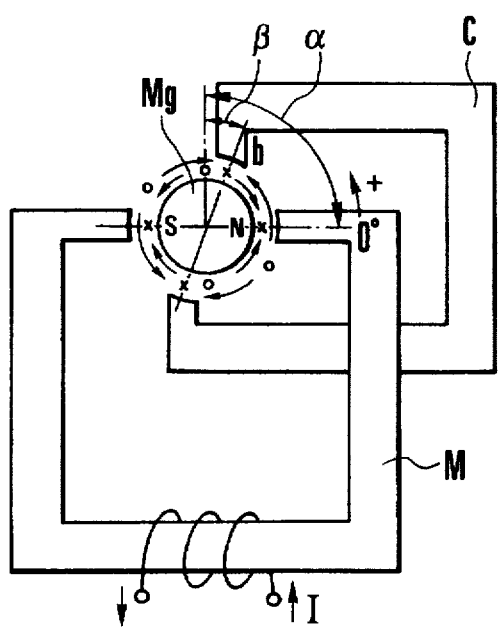

Similarly, in FIG. 18(b), the angle made by the main magnetic pole M and the interpole C in FIG. 17(b) is shifted from the position of α=360°/2P in the direction of closing rotation by an angle β of 360°/2P or less to thereby balance and adjust the detent torque.

In FIG. 18(c), the angle γ in FIG. 17(c) is further enlarged to balance and adjust the detent torque within the range:

$$360°/2P > \gamma > 0$$

Figure 18D:
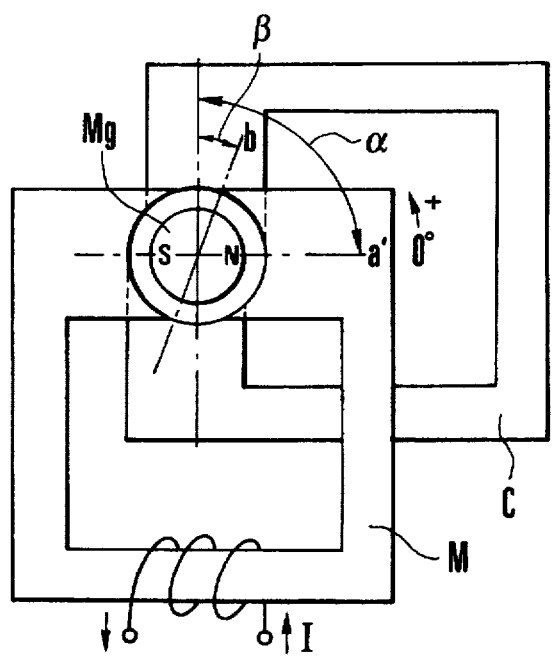

In FIG. 18(d), the angle β in FIG. 17(d) is shifted from the position of the angle α=360°/2P, made by the main magnetic pole M and the interpole C, in the direction of closing rotation by 360°/2P or less to balance and adjust the detent torque.

The available range of this motor as shown in FIG. 24(c) is a range within which the detent torque i is utilized as return torque to enable the motor to be driven by overcoming the detent torque i by the excitation torque j. The resultant force k of the detent torque i and the excitation toque j is the close torque. In this case, it is desirable for the detent torque i to be adjusted to approximately ½ of the excitation torque j.

Figure 19A:
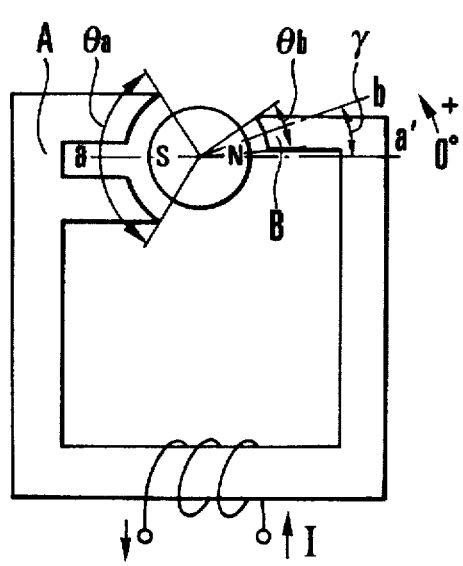
FIGS. 19(a), 19(b), 19(c) and 19(d) show another detent torque adjusting system.
Figure 19C:
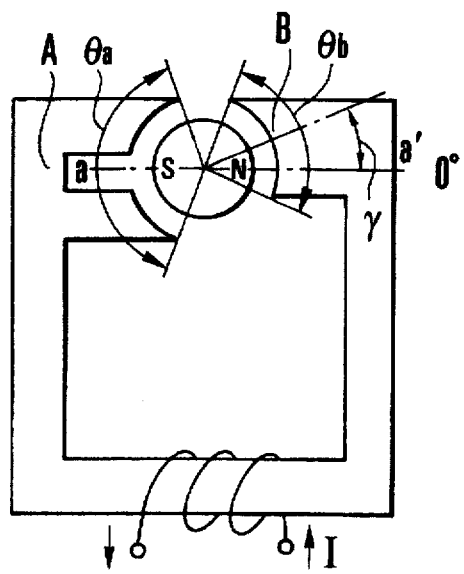
Figure 19B:
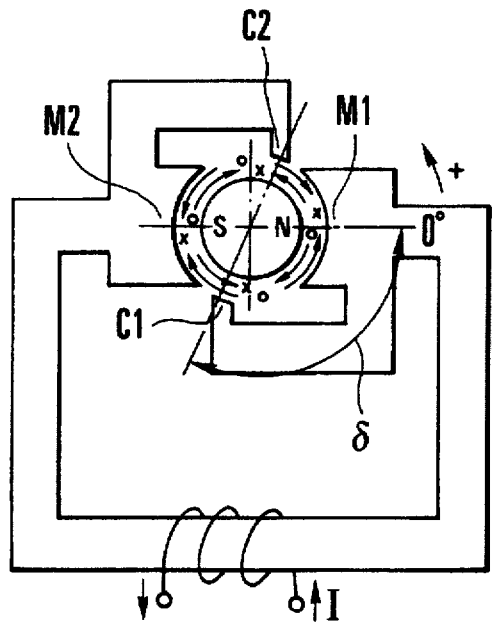
Figure 19D:
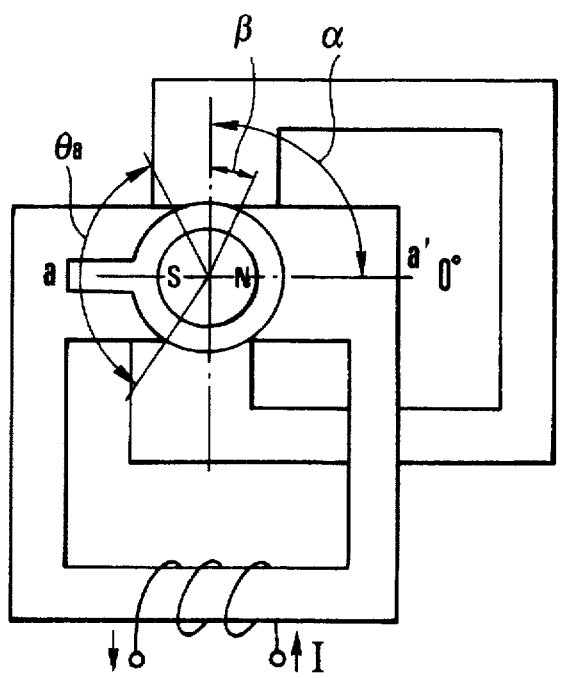

In FIGS. 19(a) through 19(d), a cutout is provided in a magnetic pole. In FIGS. 19(a), 19(c) and 19(d), a cutout is provided in the magnetic pole A of FIGS. 18(a), 18(c) and 18(d), and the open angle θ of the excitation magnetic pole A, including the cutout, is made larger than 360°/2P, whereby the detent torque component of the magnetic pole A is increased to thereby obtain a desired detent torque in synergy with the above-mentioned balancing/adjusting means.

In FIG. 19(b), which shows a modification of FIGS. 18(a) and 18(b), a cutout is formed in the return direction in the same stator such that the angle δ made by the main magnetic pole M1(M2), having an open angle larger than 360° C./2P, and the interpole C1(C2) is larger than 360°/2P, whereby the detent torque is balanced and adjusted by the angle δ.

Figure 20A:
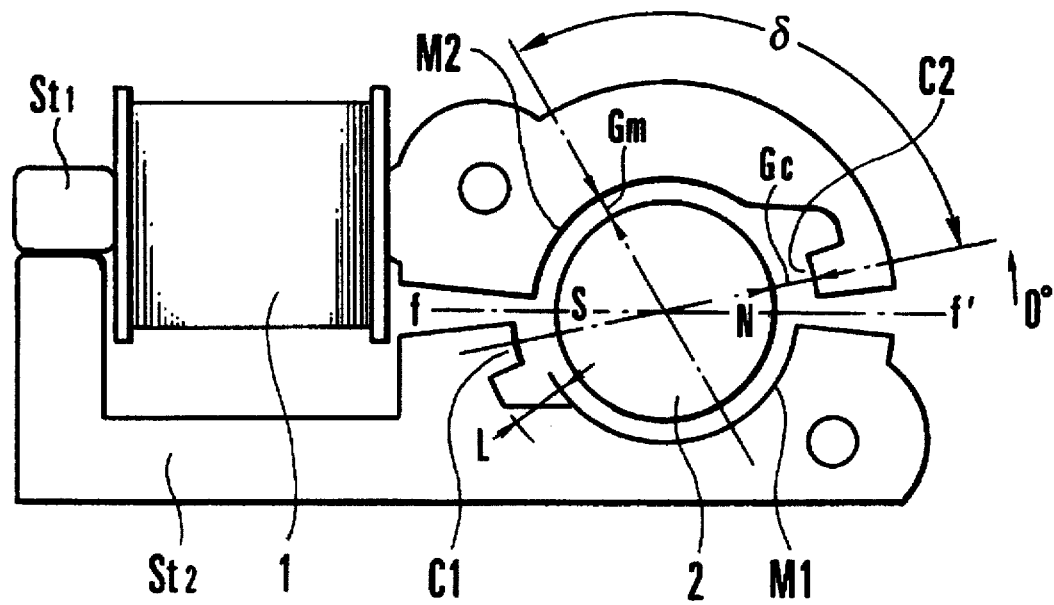
Figure 20B:
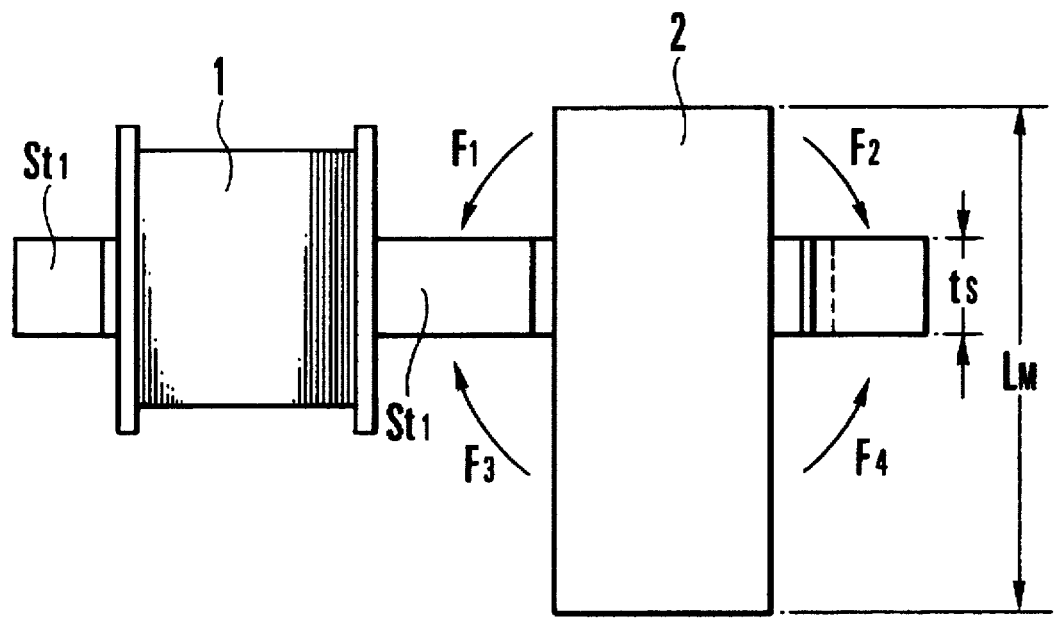

FIGS. 20(a) and 20(b) show a further modification of FIG. 19(d). In this modification of stator yoke structure, there is provided a means for enlarging the gap Gc between the interpoles C1 and C2 and the rotor magnet 2, and the depth L of the cutout is adjusted, thereby adjusting the detent torque balancing amount. FIG. 20(a) is a plan view, and FIG. 20(b) is a sectional view taken along the line f-f' of FIG. 20(b). In contrast to the uniform gap Gm of the rotor magnet 2 and the main magnetic poles M1 and M2, the gap Gc is set as follows:

$$2 \times Gm \equiv Gc$$

An effective adjusting amount for this gap is 3×Gm≧Gc>Gm, and, more preferably, approximately 2×Gm≧Gc≧1.5×Gm.

Further, as shown in FIG. 20(b), when the effective ratio V of the rotor magnet thickness $L_M$ with respect to the stator thickness $t_s$ is approximately V=$T_s/L_M$<0.5, the influence of the leakage fluxes F1, F2, F3 and F4 from the side surface of the rotor magnet to the upper and lower surfaces of the stator is conspicuous, so that adjustment is difficult with the above-described means alone. However, when the non-effective length Lf in the thrust direction of the portion where leakage magnetic flux of the rotor magnet is generated satisfies the following equation:

$$L_f = (L_M - t_s - 2G_m)/2 >> 2 \times G_m$$

the depth L of the cutout is adjusted in the range: $L_f > L > Gm$, and, more preferably, in the range: $L_f/2 > L > 2 \times G_m$, whereby the detent torque can be finely set.

Figure 21:
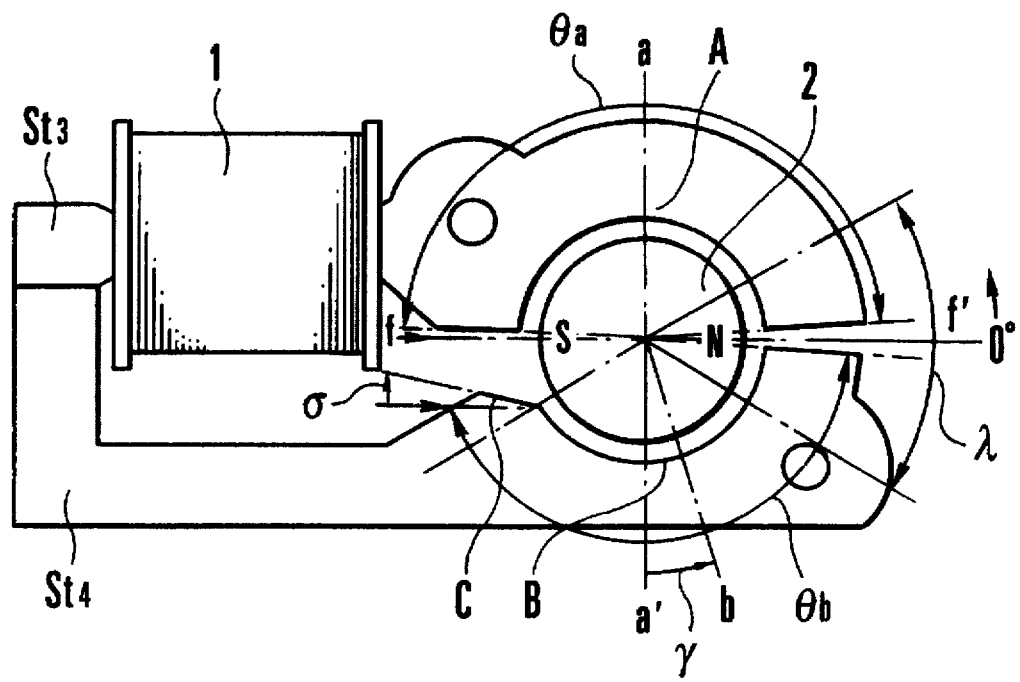
FIG. 21 is a plan view of a stator yoke in which the detent torque balancing/adjusting means shown in FIG. 17(c) is realized.

FIG. 21 shows an embodiment of stator yoke in which the detent torque is balanced substantially completely within the range of the angle λ by the detent torque balancing means of the embodiment shown in FIG. 17(c).

In FIG. 21, a driving coil 1 for excitation is wound around a stator yoke St3 with a magnetic pole A having an open angle θa that is larger than 360°/2P. This embodiment further includes a magnetic pole B whose center of open angle θb, which is larger than 360°/2P, is shifted from the opposed position a-a' of the magnetic pole A by an angle γ. A side surface C of the magnetic pole B that is on the opposite side of the above shift angle γ is brought close to the opposite magnetic pole A and inclined by an angle σ from an angle parallel to the plane f-f' passing through the center of the minimum gap of the magnetic poles A and B and the rotational position of the the rotor magnet. The embodiment further includes a stator yoke St4 connected to the stator yoke St3 and a rotor magnet 2 which is opposed to the magnetic pole A of the stator yoke St3 and the magnetic pole B of the stator yoke St4 through the intermediation of a uniform gap and which is radially 2-pole magnetized.

In contrast to the conventional rotor magnet, a cylindrical yoke having a uniform gap theoretically provides a motor free from detent torque. In reality, however, it entails problems regarding the circularity and concentricity of the yoke, etc., which problems adversely affect the operation of the motor. To prevent this, the conventional example requires high-precision parts and accurate assembly.

In this embodiment, in contrast, the detent torque can be balanced more satisfactorily and stably than in the prior-art example. This can be compared to the case of a balancing toy, teaching that, if stable, even a bad part allows adjustment.

Figure 22:
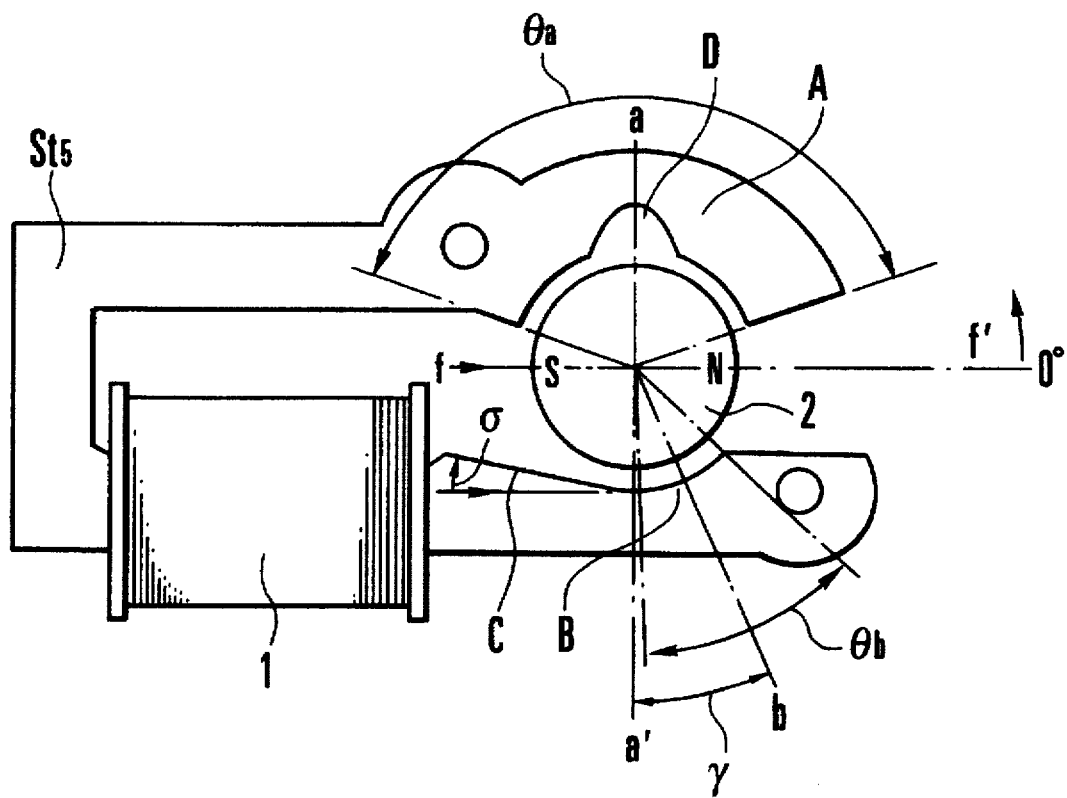
FIG. 22 is a plan view of a stator yoke in which the detent torque balancing/adjusting means shown in FIG. 19(a) is realized.

FIG. 22 shows an embodiment corresponding to FIG. 19(a), in which a U-shaped stator St5 can be utilized.

In FIG. 22, a driving coil 1 for excitation is wound around a stator yoke St5 having a magnetic pole A including a cutout D and having an open angle θa that is larger than 360°/2P, a magnetic pole B whose center of open angle θb, which is not larger than 360°/2P, is shifted from the opposed position a-a' of the magnetic pole A by an angle γ, side surface C of the magnetic pole B that is on the opposite side of the above shift angle γ is brought close to the opposite magnetic pole A and inclined by an angle σ from an angle parallel to the plane f-f' passing through the center of the minimum gap of the magnetic poles A and B and the rotational position of the the rotor magnet. The embodiment further includes a rotor magnet 2 which is opposed to the magnetic poles A and B through the intermediation of a uniform gap and which is radially 2-pole magnetized.

In the above-described embodiments, the term main poles means those stator yoke magnetic poles with driving coils wound around them which have the larger open angle, and the term interpole means those stator yoke magnetic poles of the stator yoke with or without driving coils wound around them which have the smaller open angle.

While the cutout of FIGS. 19(a) through 19(d), in particular, is formed in the magnetic pole whose open angle is larger than 360°/2P to increase the detent torque of the same phase, it is also possible to adjust the cutout position so as to adjust (set) the phase of the detent torque.

As described above, in accordance with the present invention, a one-phase excitation motor of external excitation type is used as the driving means to thereby make it possible to effect a fine and smooth light-quantity control. An external excitation type motor as the drive source of a light-quantity control device can be utilized in a video camera or the like, which is a photographic apparatus for moving images. In particular, it is possible to balance or reduce the detent torque generated in the drive source, thereby providing the following effects:

(i) A light-quantity control device which is capable of rotation with a small driving power can be realized.

(ii) Due to the remarkable reduction of the load, it is possible to greatly contribute to power saving.

(iii) Since only a minute driving power is required, it is possible to attain a reduction in size of the drive source and a reduction in cost.

(iv) Even when the magnetic force of the rotor magnetic is increased, it is possible to set an appropriate detent torque, so that it is possible to obtain a strong driving power without entailing an increase in load, thereby making it possible to attain a further reduction in the size of the drive source.

(v) The detent torque can be adjusted freely and finely, and this magnetic force can be utilized as the return force for the light-quantity control members, so that there is no need to provide a mechanical spring.

What is claimed is:

1. A light-quantity control device, comprising:
    a) a rotor having a plurality of magnetic poles rotatable within a range not larger than 180°;
    b) magnetic poles facing said rotor and provided in the same number as the magnetic poles of said rotor;
    c) a coil of one phase wound around a stator, which excites said stator when supplied with current;
    d) a light-quantity adjusting member which adjusts a passing light amount by movement; and
    e) a power transmission member which transmits the rotation of said rotor to said light-quantity adjusting member,
    wherein said stator has first and second magnetic pole sections having a different surface area in a plane facing said rotor and arranged in such a manner that the angle formed by magnetic pole centers of said first and second magnetic pole sections relative to the rotation center of said rotor is equal to the polar angle of said rotor.

2. A light-quantity control device according to claim 1, wherein the number of the magnetic poles of said rotor is P, and an open angle of at least one of said first and second magnetic pole sections is larger than 360°/2P.

3. A light-quantity control device according to claim 2, wherein the open angle of said first magnetic pole section is larger than 360°/2P, the open angle of said second magnetic pole section is less than 360°/2P so as to balance between a detent torque acting between said rotor and said first magnetic pole section and a detent torque acting between said rotor and said second magnetic pole section.

4. A light-quantity control device, comprising:
    a) a rotor having two magnetic poles and rotatable within a range not larger than 180°;
    b) a stator having two magnetic poles of first and second magnetic pole sections;
    c) a coil of one phase which excites said stator when supplied with current;
    d) a light-quantity adjusting member which adjusts a passing light amount by movement; and
    e) a power transmitting member which transmits the rotation of said rotor to said light-quantity adjusting member,
    wherein at least one of said first and second magnetic pole sections has an open angle not less than 90°, and said sections are arranged in such a manner that the angle θ formed by the centers of the magnetic poles of said first and second magnetic pole sections relative to the rotation center of said rotor satisfies the condition of 90°<θ<180°.

5. A light-quantity control device according to claim 4, wherein said first and second magnetic pole sections are arranged in such a manner that the open angles of both of said first and second magnetic pole sections are larger than 90° so as to balance a detent torque exerted between said rotor and said first magnetic pole section with a detent torque exerted between said rotor and said second magnetic pole section.

6. A light-quantity control device according to claim 4, wherein said one of the first and second magnetic pole sections having the open angle larger than 90° is provided with a notched portion.

7. A light-quantity control device, comprising:
    a) a rotor having two magnetic poles and rotatable within a range not larger than 180°;
    b) a stator having two magnetic poles of first and second magnetic pole sections;
    c) a coil of one phase which excites said stator when supplied with current;
    d) a light-quantity adjusting member which adjusts a passing light amount by movement; and
    e) a power transmitting member which transmits the rotation of said rotor to said light-quantity adjusting member,
    wherein both ends of said first magnetic pole section are symmetrical while both ends of said second magnetic pole section are non-symmetrical.

8. A light-quantity control device according to claim 7, wherein a surface area of a surface of said first magnetic pole section facing said rotor and a surface area of a surface of said second magnetic pole section facing said rotor are different.

9. A light-quantity control device according to claim 7, wherein said first magnetic pole section and said second magnetic pole section are arranged in such a manner that an angle θ formed by magnetic pole centers of said first and second magnetic pole sections relative to the rotation center of said rotor satisfies the condition of 90°<θ<180°.

10. A light-quantity control device, comprising:

a) a rotor having a plurality of magnetic poles rotatable within a range not larger than 180°;

b) a light-quantity adjusting member which adjusts a passing light amount by movement;

c) a power transmitting member which transmits the rotation of said rotor to said light-quantity adjusting member;

d) a first stator piece having first and second magnetic pole sections and a first notched portion between said first and second magnetic pole sections;

e) a second stator piece having third and fourth magnetic pole sections and a second notched portion between said third and fourth magnetic pole sections; and f) a coil which excites said first and second stator pieces when supplied with current, wherein open angles of said first and third magnetic pole sections are larger than a geometrical angle corresponding to an electric angle 90° of said rotor, and open angles of said second and fourth magnetic pole sections are smaller than a geometrical angle corresponding to an electric angle 90° of said rotor, and satisfies the conditions:

$$g1=g3,\ g2=g4,\ \text{and}\ g1(g3)<g2(g4),$$

wherein g1 is a gap between said first magnetic pole section and said rotor, g2 is a gap between said second magnetic pole section and said rotor, g3 is a gap between said third magnetic pole section and said rotor, and g4 is a gap between said fourth magnetic pole section and said rotor.

11. A light-quantity control device according to claim 10, wherein the gap g1 and the gap g2 satisfies the condition of $$g1<g2<(3\times g1).$$

12. A light-quantity control device according to claim 10, wherein the following conditions are satisfied:

$$Lf=(LM-ts-2g1)/2>>2\times g1$$

and $g1<L<Lf$, wherein ts is a thickness of said first and second stator pieces, LM is a length of said rotor in the axial direction, and L is a depth of said first and second notched portions, respectively, from a surface of said first magnetic pole section and from a surface of said third magnetic pole section.

13. An optical apparatus having a light-quantity control device, comprising:

a) a rotating member having a plurality of magnetic poles and rotatable in a range not larger than 180°;

b) a stator having a plurality of magnetic pole sections opposed to said rotating member;

c) a coil of one phase, wound around said stator, for exciting said stator;

d) input means for inputting driving speed information as the driving speed of said rotating member;

e) output means for outputting to said coil a driving signal for rotatably driving said rotating member less than one full rotation thereof on the basis of said driving speed information;

f) detection means for directly detecting a movement state of said rotating member and outputting a detection signal which varies approximately linearly with the position of said rotating member representing movement state information;

g) forming means for forming rotating speed information of said rotating member from said detection signal;

h) correcting means for correcting said driving speed information by the use of said rotating speed information, said correcting means providing corrected driving speed information;

i) a light-quantity adjusting member which adjusts a passing light amount by movement;

j) a power transmitting member which transmits the rotation of the rotor to the light-quantity adjusting member; and k) a base member for supporting said light-quantity adjusting member and also for surroundingly accommodating a whole driving source comprising said rotating member, said stator and said coil.

14. An optical apparatus according to claim 13, wherein a Hall element is used as said detection means, variation in the magnetic pole positions of said rotating member being obtained as voltage information which varies approximately linearly.

15. An optical apparatus according to claim 14, wherein said correcting means includes a differential amplifier, wherein a voltage value is used as said driving speed information, said voltage value obtained by differentiating said movement state information being input to said differential amplifier, thereby generating said corrected driving speed information.

16. An optical apparatus according to claim 14, wherein said correcting means makes said corrected driving speed information for smoothing the value of the speed of said driving speed, thereby preventing hunting by a sudden variation in quantity of light caused by said light-quantity control device.

17. An optical apparatus according to claim 13, wherein said input means compares the output of said light-quantity control device with a reference value and forms the driving speed information of said rotating member on the basis of the difference therebetween.

18. An optical apparatus according to claim 13, wherein, assuming that the torque generated in said rotating member when said coil is energized is a first torque, that the torque generated in said rotating member in spite of the energization of said coil is a second torque, and that the torque obtained by combining said first and second torques is a third torque, said first and second torques act in opposite directions, and the range in which said third torque acts in the same direction as said first torque is set as the range of rotation for said rotating member.

19. An optical apparatus according to claim 13, wherein one type of magnetic pole sections of said plurality of magnetic pole sections, provided symmetrically with respect to the center of rotation of said rotor, face said rotor with a larger surface area than the other type of magnetic pole sections.

20. An optical apparatus according to claim 13, wherein the geometrical angle made by adjacent magnetic pole sections of said plurality of magnetic pole sections with respect to the center of rotation of said rotor is different from the geometrical angle made by adjacent magnetic poles of said rotor.

21. An optical apparatus according to claim 14, wherein said Hall element is arranged so as to be opposed to a peripheral surface of said rotating member.

22. An optical apparatus according to claim 14, wherein said Hall element is arranged so as to be opposed to a flat section of said rotating member.

23. An optical apparatus having a light-quantity control device, comprising:
   a) a rotor having a plurality of magnetic poles;
   b) a stator having a plurality of magnetic pole sections facing said rotor;
   c) a coil wound around said stator to excite said stator;
   d) a light-quantity adjusting member which adjusts a passing light amount;
   e) a power transmitting member which transmits the rotation of said rotor to said light-quantity adjusting member;
   f) a base member for supporting said light-quantity adjusting member and also for surroundingly accommodating a whole driving source comprising said rotating member, said stator and said coil, wherein said base member accommodates said driving source rearward from the plane supporting said light-quantity adjusting member;
   g) a control circuit which gives a drive signal to said coil; and
   h) a printed circuit board attached directly to said base member on a rear side of the plane accommodating said driving source on which said control circuit is mounted.

24. An optical apparatus according to claim 23, further comprising a Hall device incorporated in said printed circuit board, and being positioned at an opening portion of said base member.

25. An optical apparatus according to claim 24, wherein said Hall device is arranged so as to detect changes in a peripheral magnetic pole of said rotor.

26. An optical apparatus according to claim 24, wherein said Hall device is arranged so as to detect changes in a planar magnetic pole of said rotor.

27. An optical apparatus according to claim 24, wherein said Hall device has a terminal for incorporation into said printed circuit board, said terminal having a portion almost parallel to said printed circuit board.

28. An optical apparatus according to claim 24, wherein said base member has a holding portion to hold said Hall device.

29. An optical apparatus according to claim 24, wherein, when said printed circuit board is attached to said base member, said printed circuit board provides a comb-teeth-like connecting section extending from said base member.

30. An optical apparatus according to claim 29, wherein said connecting section has a detection terminal for detecting operation of said light-quantity control device.

31. An optical apparatus according to claim 23, wherein said base member has an opening for passing a light flux therethrough, and at least part of an outer shape of said base member is almost circular relative to a center of said opening.

32. An optical apparatus according to claim 23, wherein said power transmitting member has two engagement portions for engagement with said light-quantity adjusting member, said two engagement portions making an angle not larger than 180° relative to a rotation center of said rotor.

33. An optical apparatus according to claim 23, wherein said base member has a holding portion which movably holds said light-quantity adjusting member, and said light-quantity adjusting member moves in a direction vertical to a longitudinal direction of said stator fixed to said base member.

* * * * *

UNITED STATES PATENT AND TRADEMARK OFFICE
CERTIFICATE OF CORRECTION

PATENT NO. : 5,705,873

DATED : January 6, 1998

INVENTOR(S) : Sato

It is certified that error appears in the above-identified patent and that said Letters Patent are hereby corrected as shown below:

Col. 10, line 25, delete "due-to" and insert -- due to --.

Signed and Sealed this

Fifth Day of May, 1998

Attest:

Attesting Officer

BRUCE LEHMAN

Commissioner of Patents and Trademarks